United States Patent
AlSaeed

(10) Patent No.: US 9,239,717 B1
(45) Date of Patent: Jan. 19, 2016

(54) SYSTEMS, METHODS, AND COMPUTER MEDIUM TO ENHANCE REDEPLOYMENT OF WEB APPLICATIONS AFTER INITIAL DEPLOYMENT

(71) Applicant: Saudi Arabian Oil Company, Dhahran (SA)

(72) Inventor: Husain AlSaeed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/602,376

(22) Filed: Jan. 22, 2015

(51) Int. Cl.
| G06F 9/44 | (2006.01) |
| G06F 9/445 | (2006.01) |
| G06F 11/36 | (2006.01) |
| H04L 29/08 | (2006.01) |

(52) U.S. Cl.
CPC .............. *G06F 8/65* (2013.01); *G06F 11/3688* (2013.01); *H04L 67/10* (2013.01)

(58) Field of Classification Search
CPC ........ G06F 8/65; G06F 11/3688; H04L 67/10
USPC ......................................................... 717/172
See application file for complete search history.

(56) References Cited

U.S. PATENT DOCUMENTS

| 6,854,016 | B1 * | 2/2005 | Kraenzel | G06Q 10/06 709/217 |
| 7,194,473 | B1 * | 3/2007 | Hichwa | H04L 67/02 |
| 7,634,757 | B2 | 12/2009 | de Groot et al. | |
| 7,644,432 | B2 * | 1/2010 | Patrick | H04L 63/20 713/150 |
| 8,037,190 | B2 * | 10/2011 | Apte | G06F 17/30876 709/227 |
| 8,225,281 | B1 | 7/2012 | Hardinger et al. | |
| 8,392,912 | B2 * | 3/2013 | Davis | H04L 63/0227 717/172 |
| 8,572,602 | B1 * | 10/2013 | Colton | G06F 17/3089 709/220 |
| 8,677,315 | B1 * | 3/2014 | Anderson | G06F 8/60 717/101 |
| 2005/0183143 | A1 * | 8/2005 | Anderholm | G06F 11/32 726/22 |
| 2005/0262032 | A1 * | 11/2005 | Smith | G06N 99/005 706/47 |
| 2006/0020908 | A1 * | 1/2006 | Jain | G06F 8/60 717/101 |

(Continued)

FOREIGN PATENT DOCUMENTS

| EP | 1565814 | 8/2005 |
| EP | 2113840 A1 | 11/2009 |

*Primary Examiner* — Don Wong
*Assistant Examiner* — Theodore Hebert
(74) *Attorney, Agent, or Firm* — Bracewell & Giuliani LLP; Constance G. Rhebergen; Brian H. Tompkins

(57) ABSTRACT

Embodiments of systems, non-transitory computer-readable medium having one or more computer programs stored therein, and computer-implemented methods are provided to enhance redeployment of web applications after initial deployment. Access to initial deployment of a plurality of web applications can be blocked. Lists of web applications that are candidates for redeployment can be displayed. For example, a user having a developer role can have abilities to redeploy a web application that is currently in development to a test environment. A user having a librarian role can have abilities to redeploy a web application associated with the librarian's division that is currently deployed in a test environment to a production environment. Consequently, a developer is permitted only to redeploy a web application to a test environment and cannot deploy a web application to a production environment. Application lifecycle rules thereby are enforced. Additionally, human error evasion and smart recovery features are provided.

21 Claims, 27 Drawing Sheets

(56) References Cited

U.S. PATENT DOCUMENTS

| | | | |
|---|---|---|---|
| 2008/0010198 A1* | 1/2008 | Eliscu | G06Q 40/02 705/40 |
| 2008/0134175 A1 | 6/2008 | Fitzgerald et al. | |
| 2008/0271002 A1* | 10/2008 | Susarla | G06F 9/44521 717/148 |
| 2009/0144729 A1 | 6/2009 | Guizar | |
| 2009/0164970 A1 | 6/2009 | Gentry et al. | |
| 2013/0103639 A1 | 4/2013 | Greenberg et al. | |
| 2013/0174124 A1* | 7/2013 | Watters | G06F 8/71 717/122 |
| 2014/0026203 A1 | 1/2014 | Ho | |
| 2014/0109078 A1* | 4/2014 | Lang | G06F 8/52 717/172 |
| 2014/0130035 A1* | 5/2014 | Desai | G06F 8/65 717/172 |

* cited by examiner

SYSTEMS, METHODS, AND COMPUTER MEDIUM TO ENHANCE REDEPLOYMENT OF WEB APPLICATIONS AFTER INITIAL DEPLOYMENT

BACKGROUND OF THE INVENTION

1. Field of the Invention

Embodiments of the invention relate to web-based applications and, more specifically, to systems, methods, and non-transitory computer-readable medium having computer program stored therein to publish or deploy web-based applications.

2. Description of the Related Art

An entity may utilize web-based enterprise applications (sometimes called web applications) in the entity's operations for a variety of purposes, and one or more developers may create these web applications. A developer may build or modify a web application using software such as J2EE. The developer may not be permitted to publish or deploy the web application, however, without the help of a system administrator. These restrictions on developer permissions may exist even if the developer's web application has already been deployed previously. For example, a developer may issue a request to redeploy a web application that is then assigned to a system administrator. The system administrator may then work on the request, copy the web application to be redeployed, and redeploy the web application. That is, a system administrator may manually redeploy a web application after stopping and deleting the old version of the web application, if there is one.

For example, as illustrated in FIG. 2, redeployment of web applications may involve developer actions 1500, help desk actions 1600, and system administrator actions 1700. A developer 150, for instance, may issue a request 1501 to redeploy one of the developer's web applications. A help desk 160 then may assign the request 1601 to a system administrator 170, e.g., a WebLogic support (WLS) system administrator. Then, the assigned system administrator 170 may work on the request 1701. For example, the system administrator 170 may copy the web application 1702 and deploy the web application 1703. The system administrator 170 next may determine whether the deployment was successful 1704. If the deployment was successful 1704, the system administrator 170 may log options related to the redeployment and the web application's status in a file 1705. If the deployment was unsuccessful 1704, however, the system administrator may analyze the logs 1706, for example, then again copy the application 1702.

SUMMARY OF THE INVENTION

Applicant has recognized problems associated with such redeployment processes. A system administrator, for example, may not always enforce lifecycle rules, such as ensuring that web applications do not move directly from development to production without undergoing some testing. Moreover, logs may be generated after the system administrator attempts to redeploy a web application (regardless of whether the redeployment was successful) that document changes in a web application over its lifecycle, but the logs may be difficult to analyze. Further, a system administrator may inadvertently redeploy a web application to an incorrect or unsuitable domain or server. In addition, the whole business process of applications deployments may not always be considered.

Having recognized that, in some cases, application lifecycle rules are not always enforced and that errors sometimes occur in the redeployment process, for example, embodiments of systems, computer-implemented methods, and non-transitory computer-readable medium having computer program stored therein to enhance redeployment of web applications after initial deployment are provided herein. Embodiments advantageously can improve the productivity of web application developers and administrators, as well as the quality of applications in production. In addition, embodiments can provide quick and easy deployment of applications while avoiding bureaucracy, e.g., as when developers are required to send deployment requests to a help desk and then to system administrators, such as WebLogic support. Reducing the steps and people involved in handling each redeployment request can reduce turn-around time to deploy applications into staging, test, and production. Further, embodiments can help to ensure the maturity of applications before going to production. For example, embodiments can require developers to thoroughly test their applications before quality check certification is granted. Consequently, embodiments thus can improve the quality of production applications, which can lead to a reduction in production application redeployments by 50%, for instance.

Embodiments of the claimed invention, for example, can include systems, computer-implemented methods, and non-transitory computer-readable medium having computer program stored therein to enhance redeployment of web applications after initial deployment. For example, a system to enhance redeployment of web applications after initial deployment according to an embodiment can include, for instance, one or more processors and one or more databases in communication with the one or more processors. The one or more databases also can have data associated with a plurality of web applications stored therein. Further, each of the plurality of web applications can be configured to have an associated current deployment status. For example, current deployment status can include one or more of the following: in development and deployed in a test environment. A system further can include one or more input and output units in communication with the one or more processors. The one or more input and output units can be positioned to receive input and output communication, for example. Further, a system can include one or more displays in communication with the one or more processors, and the one or more displays can be configured to display an electronic user interface thereon. A system also can include non-transitory memory medium in communication with the one or more processors. More specifically, the memory medium can include, for example, an access module, a redeployment-eligible web applications module, and a redeployment module.

For instance, the access module can include computer-readable instructions stored therein that when executed cause the one or more processors to perform the step of blocking access to initial deployment of the plurality of web applications to a plurality of users. Each user can be configured to have a user identifier, for example. Further, each of the plurality of web applications can be configured to be associated with a user identifier of one or more of the plurality of users in a web application developer role. The one or more of the plurality of users in a web application developer role thereby can define one or more developer users, for example. Additionally, each of the plurality of web applications further can be configured to be associated with a user identifier of a different one or more of the plurality of users in a web application librarian role. Likewise, the one or more of the plurality of users in a web application librarian role thereby can define one or more librarian users. Moreover, a librarian role can be configured to indicate authorization to redeploy a web application to a production environment.

In addition, the redeployment-eligible web applications module can include computer-readable instructions stored therein that when executed cause the one or more processors to perform a series of steps. For example, the steps can include displaying a list of a first set of one or more web applications of the plurality of web applications to one of the plurality of users. Displaying the list of the first set of one or more web applications can be responsive to a determination (1) that each of the first set of web applications has a current deployment status of in development and (2) that the user identifier associated with the respective one of the plurality of users includes an indicator that the associated user is one of the one or more developer users associated with the respective web application. Similarly, the steps of the redeployment-eligible web applications module also can include displaying a list of second set of another one or more web applications of the plurality of web applications to the one of the plurality of users. Displaying the list of the second set of one or more web applications can be responsive to a determination (1) that each of the second set of web applications has a current deployment status of deployed in a test environment and (2) that the user identifier associated with the respective one of the plurality of users includes an indicator of a librarian role associated with each of the second set of web applications.

Still further, the redeployment module can include computer-readable instructions stored therein that when executed cause the one or more processors to perform a series of steps. For example, some steps of the redeployment module can be responsive to user selection of a web application from the list of the first set of web applications. The web application from the list of the first set of web applications thereby can define a first selected web application. Responsive to user selection of the first selected web application, for example, the steps can include determining a domain and server in the test environment configured to host the first selected web application upon redeployment. The domain and server thereby can define a redeployment test destination. The steps can then include, for instance, redeploying the first selected web application to the redeployment test destination. Redeploying the first selected web application to the redeployment test destination advantageously thereby can reduce redeployment time. The steps can further include determining whether the redeployment to the redeployment test destination was successful. Further, the steps can include generating a notification to indicate that the first selected web application is in test by use of the electronic user interface when the redeployment to the redeployment test destination was successful. Similarly, the steps can include sending an electronic message to the one of the plurality of users to indicate that the first selected web application is in test when the redeployment to the redeployment test destination was successful.

In addition, some steps of the redeployment module can be responsive to user selection of a web application from the list of the second set of web applications. The web application from the list of the second set of web applications thereby can define a second selected web application. For example, responsive to user selection of the second selected web application, the steps can include determining a domain and server in the production environment configured to host the second selected web application upon redeployment. The domain and server thereby can define a redeployment production destination, for example. Further, the production environment can be configured to be different than the test environment. The steps can then include redeploying the second selected web application to the redeployment production destination. Advantageously, redeploying the second selected web application to the redeployment production destination thereby can reduce redeployment time and control deployment to the production environment. The steps further can include determining whether the redeployment to the redeployment production destination was successful. Still further, the steps can include generating a notification to indicate that the second selected web application is in production by use of the electronic user interface when the redeployment to the redeployment production destination was successful. The steps also can include sending an electronic message to the one of the plurality of users to indicate that the second selected web application is in production when the redeployment to the redeployment production destination was successful.

In some circumstances, redeploying the first selected web application can include replacing a prior version of the first selected web application, for example. Similarly, redeploying the second selected web application can include replacing a prior version of the second selected web application. In addition, in some instances, the redeployment module further can include computer-readable instructions stored therein that when executed cause the one or more processors to perform the steps of archiving the prior version of the first selected web application when redeployment of the first selected web application was successful and archiving the prior version of the second selected web application when redeployment of the second selected web application was successful.

In other circumstances, redeploying the first selected web application can include deploying the first selected web application while continuing to operate a prior version of the first selected web application. Likewise, redeploying the second selected web application can include deploying the second selected web application while continuing to operate a prior version of the second selected web application.

Further, the test environment can include a functional testing environment and an operational testing environment, and the plurality of web applications can be related to one or more of the following: petroleum engineering and petroleum exploration. The plurality of web applications also can be one or more of the following: J2EE web applications and .NET web applications. In some circumstances, only a predetermined and limited number of web applications can be permitted to be redeployed to the production environment within a predetermined time period. For example, the predetermined and limited number of web applications can be two web applications, and the predetermined time period can be one week. Additionally, each of the first set of web applications can have been deployed previously in at least an initial deployment responsive to action associated with one or more administrator roles. Similarly, each of the second set of web applications can have been deployed previously in at least an initial deployment responsive to action associated with the one or more administrator roles. Further, redeploying the first selected web application to the redeployment test destination can be independent of action associated with the one or more administrator roles, and redeploying the second selected web application to the redeployment production destination similarly can be independent of action associated with the one or more administrator roles.

In some instances, each of the first set of web applications can be configured to be displayed to only one user having a user identifier that includes an indicator that the associated user is one of the one or more developer users associated with the respective web application at a time. Further, the redeployment module further can include computer-readable instructions stored therein that when executed cause the one or more processors to perform the steps of—when a redeployment was unsuccessful—generating a notification to indicate that redeployment failed by use of the electronic user interface and sending an electronic message to the one of plurality of users to indicate that the redeployment failed.

Embodiments also can include computer-implemented methods to enhance redeployment of web applications after initial deployment. For example, a method according to an embodiment can include blocking access to initial deployment of a plurality of web applications to a plurality of users. Each user can be configured to have a user identifier, for example. Further, each of the plurality of web applications can be configured to be associated with a user identifier of one or more of the plurality of users in a web application developer role. The one or more of the plurality of users in a web application developer role thereby can define one or more developer users, for example. In addition, each of the plurality of web applications further can be configured to be associated with a user identifier of a different one or more of the plurality of users in a web application librarian role. The one or more of the plurality of users in a web application librarian role thereby can define one or more librarian users, for example. Further, a librarian role can be configured to indicate authorization to redeploy a web application to a production environment. Each of the plurality of web applications still further can be configured to have an associated current deployment status. For example, current deployment status can include one or more of the following: in development and deployed in a test environment.

A method further can include displaying a list of a first set of one or more web applications of the plurality of web applications to one of the plurality of users. Displaying the list of the first set of one or more web applications can be responsive to a determination that each of the first set of web applications has a current deployment status of in development and that the user identifier associated with the respective one of the plurality of users includes an indicator that the associated user is one of the one or more developer users associated with the respective web application, for example. A method also can include displaying a list of second set of another one or more web applications of the plurality of web applications to the one of the plurality of users. Displaying the list of the second set of one or more web applications can be responsive to a determination that each of the second set of web applications has a current deployment status of deployed in a test environment and that the user identifier associated with the respective one of the plurality of users includes an indicator of a librarian role associated with each of the second set of web applications.

In addition, a method can include steps responsive to user selection of a web application from the list of the first set of web applications thereby to define a first selected web application. For example, steps can include determining a domain and server in the test environment configured to host the first selected web application upon redeployment. The domain and server thereby can define a redeployment test destination, for example. Steps further can include redeploying the first selected web application to the redeployment test destination thereby to reduce redeployment time, as well as determining whether the redeployment to the redeployment test destination was successful. In addition, steps can include generating a notification to indicate that the first selected web application is in test by use of an electronic interface when the redeployment to the redeployment test destination was successful. Similarly, steps can include sending an electronic message to the one of the plurality of users to indicate that the first selected web application is in test when the redeployment to the redeployment test destination was successful.

A method also can include steps responsive to user selection of a web application from the list of the second set of web applications thereby to define a second selected web application. For instance, steps can include determining a domain and server in the production environment configured to host the second selected web application upon redeployment. The domain and server, for example, thereby can define a redeployment production destination, and the production environment can be configured to be different than the test environment. Steps further can include redeploying the second selected web application to the redeployment production destination thereby to reduce redeployment time and control deployment to the production environment. Still further, steps can include determining whether the redeployment to the redeployment production destination was successful. When the redeployment to the redeployment production destination was successful, steps can include generating a notification to indicate that the second selected web application is in production by use of an electronic interface and sending an electronic message to the one of the plurality of users to indicate that the second selected web application is in production, for example.

In some circumstances, redeploying the first selected web application can include replacing a prior version of the first selected web application, and redeploying the second selected web application can include replacing a prior version of the second selected web application. Further, the method further can include archiving the prior version of the first selected web application when redeployment of the first selected web application was successful and archiving the prior version of the second selected web application when redeployment of the second selected web application was successful. In other circumstances, for example, redeploying the first selected web application can include deploying the first selected web application while continuing to operate a prior version of the first selected web application, and redeploying the second selected web application can include deploying the second selected web application while continuing to operate a prior version of the second selected web application.

Additionally, the test environment can include a functional testing environment and an operational testing environment. Further, the plurality of web applications can be related to one or more of the following: petroleum engineering and petroleum exploration. The plurality of web applications also can be one or more of the following: J2EE web applications and .NET web applications. In some instances, only a predetermined and limited number of web applications can be permitted to be redeployed to the production environment within a predetermined time period. For example, the predetermined and limited number of web applications can be two web applications, and the predetermined time period can be one week. Further, each of the first set of web applications can have been deployed previously in at least an initial deployment responsive to action associated with one or more administrator roles. Similarly, each of the second set of web applications can have been deployed previously in at least an initial deployment responsive to action associated with the one or more administrator roles. In addition, redeploying the first selected web application to the redeployment test destination can be independent of action associated with the one or more administrator roles, and redeploying the second selected web application to the redeployment production destination also can be independent of action associated with the one or more administrator roles.

In some circumstances, each of the first set of web applications can be configured to be displayed to only one user having a user identifier that includes an indicator that the associated user is one of the one or more developer users associated with the respective web application at a time. Further, a method further can include, when a redeployment was unsuccessful, generating a notification to indicate that redeployment failed by use of the electronic interface and sending an electronic message to the one of plurality of users to indicate that the redeployment failed.

Embodiments additionally can include non-transitory computer-readable medium having one or more computer programs stored therein operable by one or more processors to enhance redeployment of web applications after initial deployment. For example, in non-transitory computer-readable medium according to an embodiment, the one or more computer programs can include a set of instructions that, when executed by the one or more processors, cause the one or more processors to perform a series of operations. Those operations can include, for example, blocking access to initial deployment of a plurality of web applications to a plurality of users. Each user can be configured to have a user identifier, and each of the plurality of web applications configured to be associated with a user identifier of one or more of the plurality of users in a web application developer role thereby to define one or more developer users. Additionally, each of the plurality of web applications further can be configured to be associated with a user identifier of a different one or more of the plurality of users in a web application librarian role thereby to define one or more librarian users. For example, a librarian role can be configured to indicate authorization to redeploy a web application to a production environment. Each of the plurality of web applications still further can be configured to have an associated current deployment status, and current deployment status including one or more of the following: in development and deployed in a test environment.

Operations also can include displaying a list of a first set of one or more web applications of the plurality of web applications to one of the plurality of users responsive to a determination that each of the first set of web applications has a current deployment status of in development and that the user identifier associated with the respective one of the plurality of users includes an indicator that the associated user is one of the one or more developer users associated with the respective web application. Operations further can include displaying a list of second set of another one or more web applications of the plurality of web applications to the one of the plurality of users responsive to a determination that each of the second set of web applications has a current deployment status of deployed in a test environment and that the user identifier associated with the respective one of the plurality of users includes an indicator of a librarian role associated with each of the second set of web applications.

In addition, some operations can be responsive to user selection of a web application from the list of the first set of web applications thereby to define a first selected web application. For example—responsive to user selection of a first selected web application—operations can include determining a domain and server in the test environment configured to host the first selected web application upon redeployment. The domain and server thereby can define a redeployment test destination, for example. Operations then can include redeploying the first selected web application to the redeployment test destination thereby to reduce redeployment time and determining whether the redeployment to the redeployment test destination was successful. Still further, operations can include generating a notification to indicate that the first selected web application is in test by use of an electronic interface when the redeployment to the redeployment test destination was successful. Operations also can include sending an electronic message to the one of the plurality of users to indicate that the first selected web application is in test when the redeployment to the redeployment test destination was successful.

Likewise, some operations can be responsive to user selection of a web application from the list of the second set of web applications thereby to define a second selected web application. For instance, operations responsive to user selection of a second selected web application can include determining a domain and server in the production environment configured to host the second selected web application upon redeployment. The domain and server, for example, thereby can define a redeployment production destination. Further, the production environment can be configured to be different than the test environment. Operations then can include redeploying the second selected web application to the redeployment production destination thereby to reduce redeployment time and control deployment to the production environment. Operations also can include determining whether the redeployment to the redeployment production destination was successful. In addition, operations can include generating a notification to indicate that the second selected web application is in production by use of an electronic interface when the redeployment to the redeployment production destination was successful. When the redeployment to the redeployment production destination was successful, operations also can include sending an electronic message to the one of the plurality of users to indicate that the second selected web application is in production.

In some circumstances, redeploying the first selected web application can include replacing a prior version of the first selected web application, and redeploying the second selected web application can include replacing a prior version of the second selected web application. Additionally, the set of instructions, when executed by the one or more processors, further can cause the one or more processors to perform the operations of archiving the prior version of the first selected web application when redeployment of the first selected web application was successful and archiving the prior version of the second selected web application when redeployment of the second selected web application was successful.

In other circumstances, redeploying the first selected web application can include deploying the first selected web application while continuing to operate a prior version of the first selected web application. Similarly, redeploying the second selected web application can include deploying the second selected web application while continuing to operate a prior version of the second selected web application.

The test environment can include a functional testing environment and an operational testing environment, for example. Additionally, the plurality of web applications can be related to one or more of the following: petroleum engineering and petroleum exploration. Further, the plurality of web applications can be one or more of the following: J2EE web applications and .NET web applications. In some instances, only a predetermined and limited number of web applications can be permitted to be redeployed to the production environment within a predetermined time period. For example, the predetermined and limited number of web applications can be two web applications, and the predetermined time period can be one week. Further, each of the first set of web applications can have been deployed previously in at least an initial deployment responsive to action associated with one or more administrator roles. Likewise, each of the second set of web applications can have been deployed previously in at least an initial deployment responsive to action associated with the one or more administrator roles. Redeploying the first selected web application to the redeployment test destination, for example, can be independent of action associated with the one or more administrator roles. In addition, redeploying the second selected web application to the redeployment production destination can be independent of action associated with the one or more administrator roles.

In some instances, each of the first set of web applications can be configured to be displayed to only one user having a user identifier that includes an indicator that the associated user is one of the one or more developer users associated with the respective web application at a time. Further, the set of instructions, when executed by the one or more processors, further can cause the one or more processors to perform the operations of—when a redeployment was unsuccessful—generating a notification to indicate that redeployment failed by use of the electronic interface and sending an electronic message to the one of plurality of users to indicate that the redeployment failed.

Embodiments of the invention therefore can cause an improvement in technology related to redeployment of web applications. For example, embodiments can enforce application lifecycle rules and security rules. Additionally, embodiments of the invention can provide for smart recovery and human error evasion features thereby to enhance redeployment of web applications.

Further, embodiments can effect a change in a computer itself. For example, at least one consequence of employing embodiments of the invention can be that a new version of a web application has been deployed to either a test environment or a production environment that was not previously in operation. That newly deployed web application version is then operable and available either in production or for testing. As a result, a user of an entity's computer system, for example, can have access to features of the redeployed web application that were previously unavailable to the user. Moreover, the available functions of the computer system can be expanded as a result of the redeployment of the web application. For example, a web application as redeployed can be more efficient than the originally deployed version of the application. Embodiments of the invention thus can improve the functioning of a computer system itself.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
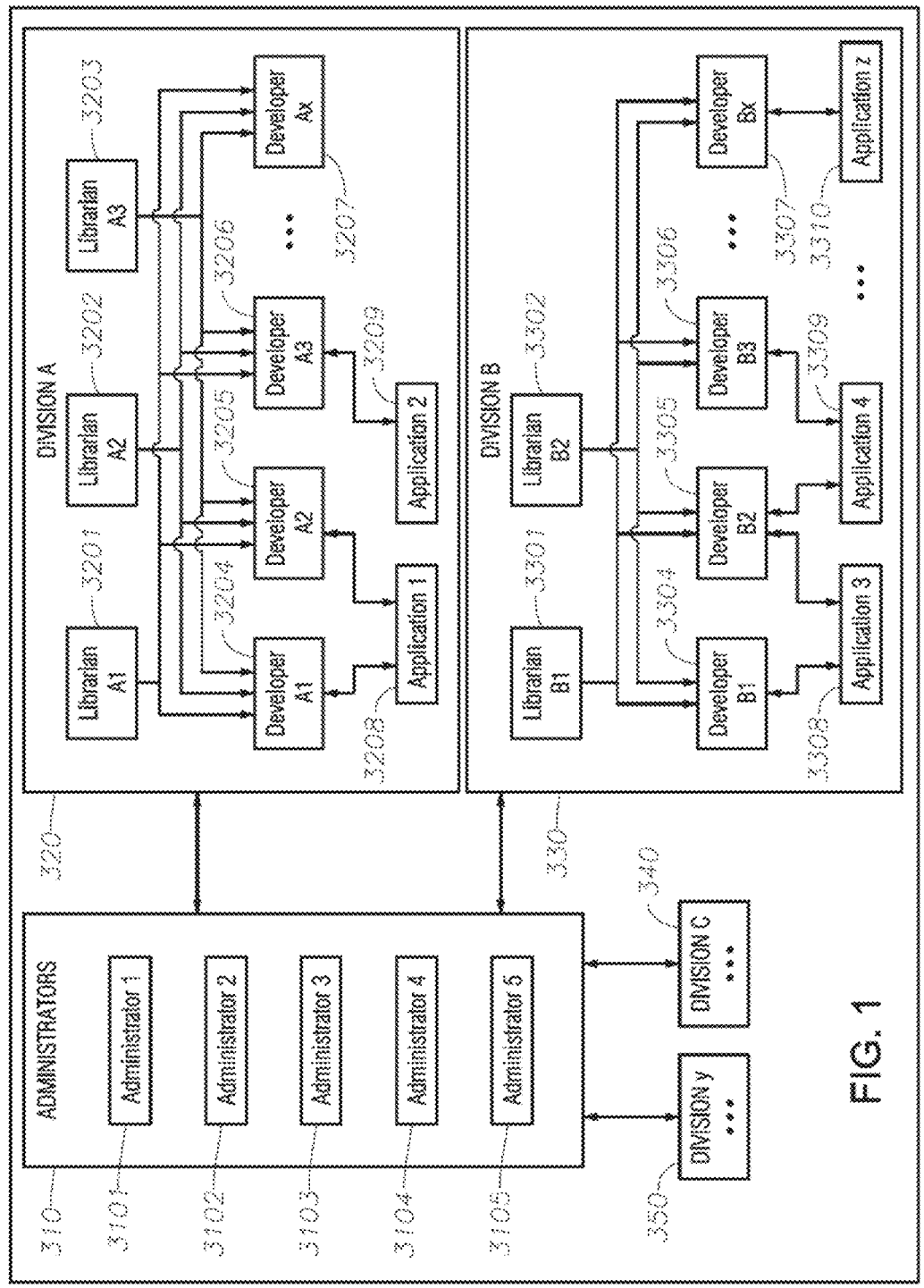
FIG. 1 is a schematic diagram of a system according to an embodiment of the invention.
Figure 2:
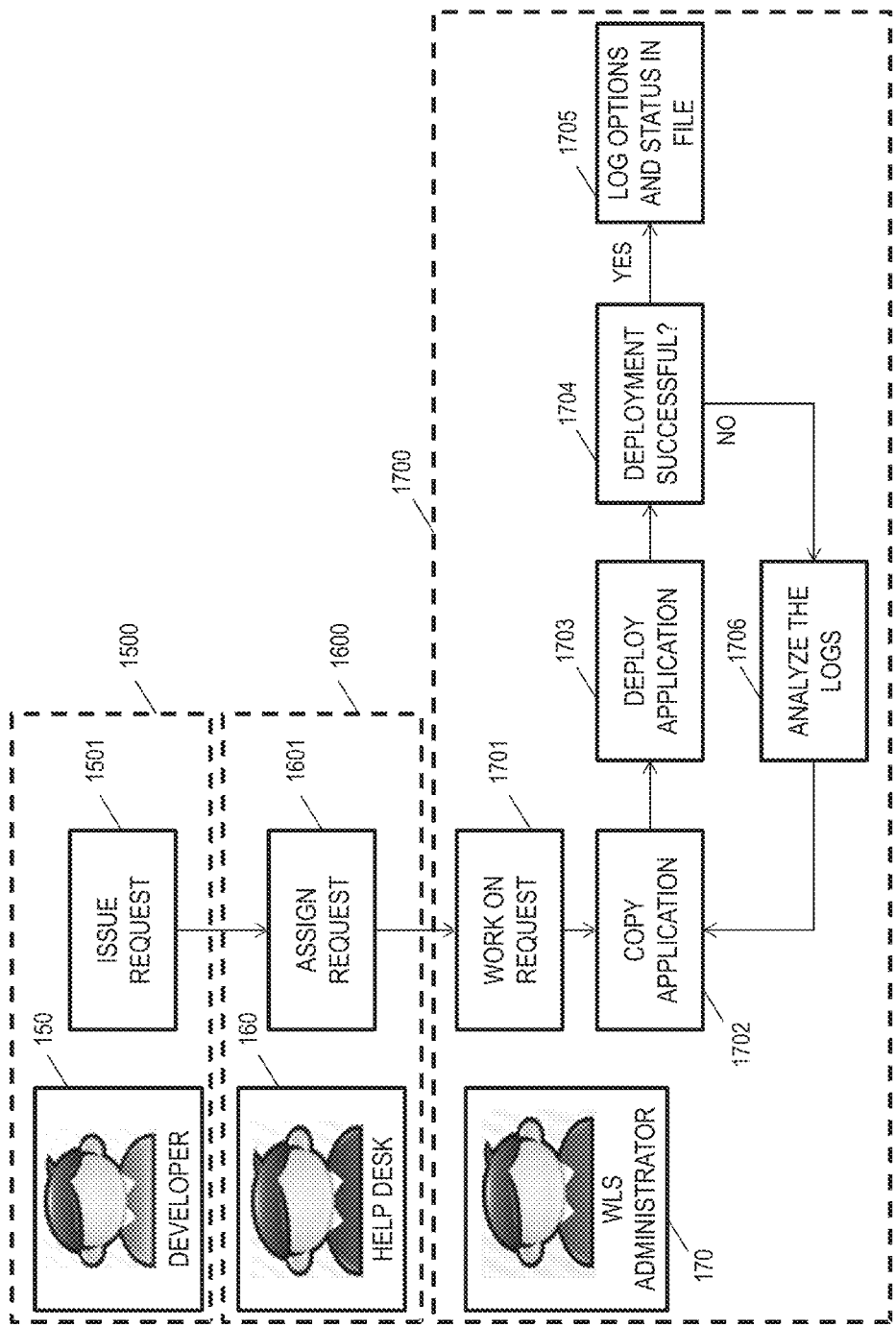
FIG. 2 is a schematic diagram of a method according to the prior art.

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Embodiments of the invention can include a tool intended and developed to automate web applications deployment for J2EE applications developers. For example, such a tool can contain built-in logic to cater for various security rules, smart recovery, application lifecycle rules, and human error evasion. Security rules, for example, can include restricting a developer to having the ability to deploy only the developer's own developed applications. Security rules also can include preventing developers from deploying applications to production; rather, deployment-to-production capabilities can be limited to librarians only. For instance, a division's librarians can be able to deploy the division's applications, whereas a developer can be limited to redeploying the developer's own applications to a test environment. Smart recovery features can include archiving an old version of an application when a new version is deployed. Alternatively, the old and new versions can be deployed side-by-side such that the old version will still work if the new version fails. Application lifecycle rules can include moving applications from development to test to production, rather than directly from development to production. Additionally, human error evasion can include ensuring that an application will be deployed to the correct server.

For example, embodiments of the invention can include a deployment engine developed using WebLogic server APIs that will allow command deployments of applications. The inputs of the deployment command can be the WebLogic domain and server to which the application subsequently will be deployed. These WebLogic domains and servers can be defined in a database that can be used when communicating with the command-based deployer. An engine used in embodiments of the invention can be based on WebLogic APIs, for example. In addition, embodiments of the invention can use single sign-on (SSO) authentication, for example, and thereby eliminate any need for a separate authentication step for users. Further, an exemplary embodiment can include a web application that is based on service architecture through Remote Method Invocation (RMI). The web application can represent a client side that invokes methods that are running by a server side process. The methods exposed by the server process can include one method for deploying an application and another method for getting the status of a recent deployment. Embodiments can use, for example, active directory authentication and can be integrated with a change control system, e.g., Remedy, to adhere to deployment and security rules. Embodiments advantageously thus can offer flexibility and control of deployments.

Further, the tool also can include security conditions, such as introducing a librarian role, and documenting an application change's justification and objective. For example, embodiments can relate to J2EE web applications publishing or deployment. An embodiment, for instance, can include a computer system adapted to deploy an application program. Also, embodiments can include a method of deploying an application program in a computer system, for example. Embodiments can enforce applications lifecycle and deployment rules by a system, for example, and can feature human error evasion when deploying applications. Further, embodiments can introduce automatic and online deployment of WebLogic applications that an existing vendor does not provide, for example. Embodiments advantageously can combine flexibility and ease of use, as well as apply security restrictions, change management controls, and operational requirements. Further, embodiments can improve productivity, save man hours spent in deploying applications, and ensure security and quality of web applications.

Embodiments advantageously can change a deployment procedure from a manual procedure, e.g., using a WebLogic console, to an automatic procedure, e.g., using deployment scripts. Further, an online application, e.g., application deployer system (ADS), can utilize the scripts and document all deployment trails in a database that contains all information about all applications, for example. Moreover, the deployment application can be integrated with an application change control system, e.g., Remedy. In addition, the deployment application can cater for security, lifecycle, and deployment rules.

As a result, embodiments of the invention can provide numerous benefits. For example, embodiments can reduce the number of deployment requests, e.g., by 80%. Further, in some circumstances, an average of one full-time equivalent of web hosting administrator time can be saved for every 100 applications hosted. An entity also can save about twelve hours per day for administering 150 applications. Embodiments advantageously can introduce automatic and online deployment of WebLogic applications in a manner that is flexible, easy, and—at the same time—restricted according to security, change management, and operational requirements, for example.

In addition, embodiments of the invention can solve problems such as a long turn-around time, e.g., by reducing the turn-around time for deployment from days to seconds. For example, embodiments can reduce the deployment time to few minutes as a result of automated scripts that use WebLogic deployment APIs. Embodiments also can feature the automation of procedures besides the automatic deployment, such as various aspects of the deployment process like authentication, authorization, security, quality assurance, roles, and responsibilities. Embodiments thereby can manage quantity and quality of applications deployments.

Figure 4:
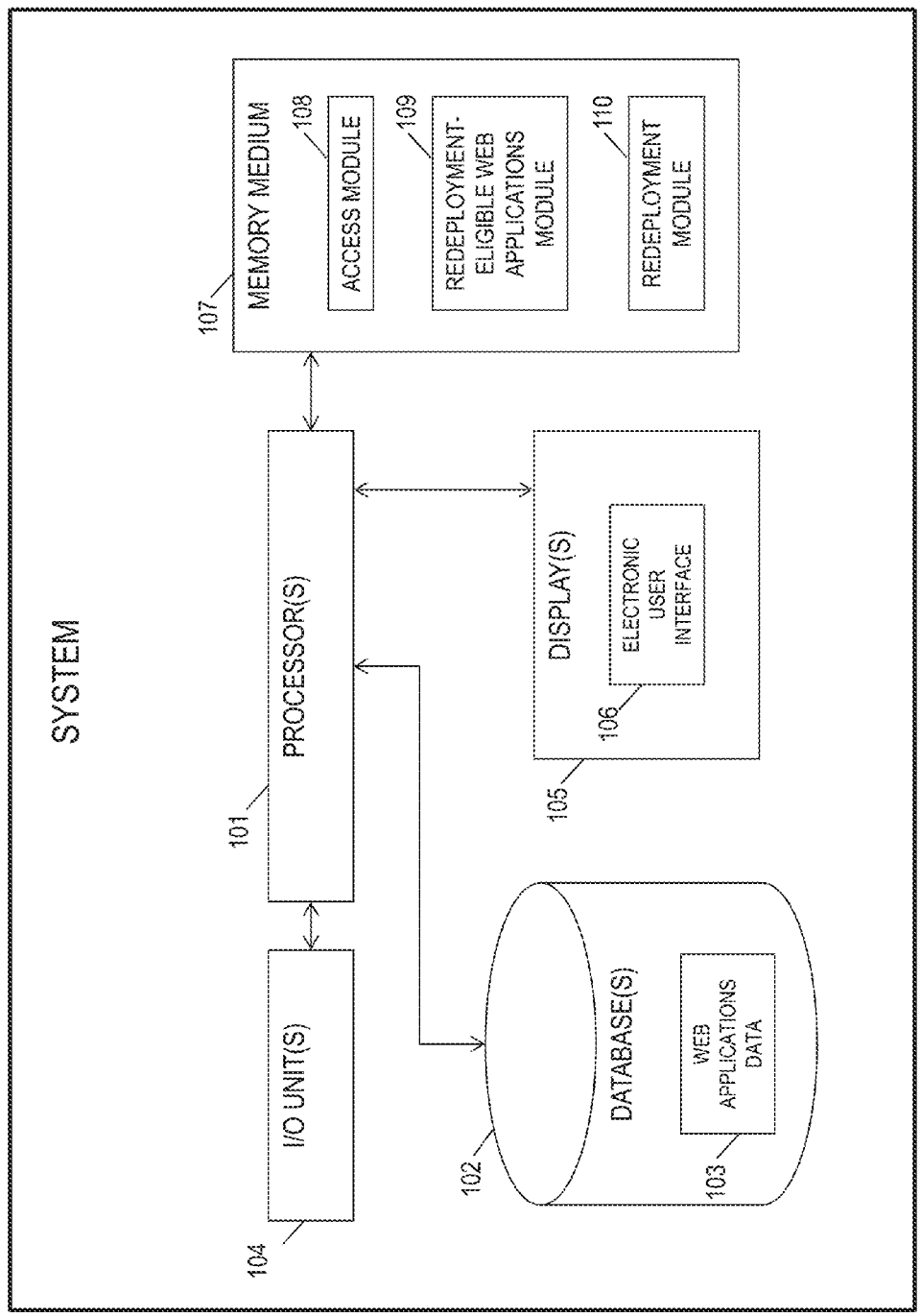
FIG. 4 is a schematic diagram of a system according to an embodiment of the invention.

Embodiments of the invention can include, for example, systems, computer-implemented methods, and non-transitory computer-readable medium having computer program stored therein to enhance redeployment of web applications after initial deployment. For example, a system to enhance redeployment of web applications after initial deployment according to an embodiment can include, for instance, one or more processors 101 and one or more databases 102 in communication with the one or more processors 101, as illustrated in FIG. 4, for example. The one or more databases 102 also can have data 103 associated with a plurality of web applications stored therein. Further, each of the plurality of web applications can be configured to have an associated current deployment status. For example, current deployment status can include one or more of the following: in development and deployed in a test environment. A system further can include one or more input and output units 104 in communication with the one or more processors 101. The one or more input and output units 104 can be positioned to receive input and output communication, for example. Further, a system can include one or more displays 105 in communication with the one or more processors 101, and the one or more displays 105 can be configured to display an electronic user interface 106 thereon. A system also can include non-transitory memory medium 107 in communication with the one or more processors 101. More specifically, the memory medium 107 can include, for example, an access module 108, a redeployment-eligible web applications module 109, and a redeployment module 110.

For instance, the access module 108 can include computer-readable instructions stored therein that when executed cause the one or more processors 101 to perform the step of blocking access to initial deployment of the plurality of web applications to a plurality of users. Each user can be configured to have a user identifier, for example. Further, each of the plurality of web applications can be configured to be associated with a user identifier of one or more of the plurality of users in a web application developer role. The one or more of the plurality of users in a web application developer role thereby can define one or more developer users, for example. Additionally, each of the plurality of web applications further can be configured to be associated with a user identifier of a different one or more of the plurality of users in a web application librarian role. Likewise, the one or more of the plurality of users in a web application librarian role thereby can define one or more librarian users. Moreover, a librarian role can be configured to indicate authorization to redeploy a web application to a production environment. That is, an individual web application can be associated with one or more developer users as well as one or more librarian users. For instance, Application 1 3208—as depicted in FIG. 1, for example—is associated with Developer A1 3204 and Developer A2 32305, as well as Librarian A1 3201, Librarian A2 3202, and Librarian A3 3203. Consequently, the access module 108 can prevent both developer users and librarian users from deploying a web application in an initial deployment, and initial deployment capabilities thereby can be restricted to others, e.g., system administrators.

In addition, the redeployment-eligible web applications module 109 can include computer-readable instructions stored therein that when executed cause the one or more processors 101 to perform a series of steps. For example, the steps can include displaying a list of a first set of one or more web applications of the plurality of web applications to one of the plurality of users. Displaying the list of the first set of one or more web applications can be responsive to a determination (1) that each of the first set of web applications has a current deployment status of in development and (2) that the user identifier associated with the respective one of the plurality of users includes an indicator that the associated user is one of the one or more developer users associated with the respective web application. Similarly, the steps of the redeployment-eligible web applications module 109 also can include displaying a list of second set of another one or more web applications of the plurality of web applications to the one of the plurality of users. Displaying the list of the second set of one or more web applications can be responsive to a determination (1) that each of the second set of web applications has a current deployment status of deployed in a test environment and (2) that the user identifier associated with the respective one of the plurality of users includes an indicator of a librarian role associated with each of the second set of web applications. As a result, a developer user can see web applications that the developer user created, for example. Further, a librarian user can see web applications for the librarian user's division that the librarian user did not create, for instance. An individual user can serve as both a developer user and a librarian user, but a single user can be prohibited from serving as a librarian user for an application that the user also created or developed as a developer. That is, an single user can be prevented from having access to the same web application as both a developer user and a librarian user. Further, the list of the first set of web applications can be displayed separately from the list of the second set of web applications; alternatively, the two lists can be displayed together, i.e., as part of one general list of web applications.

Still further, the redeployment module 110 can include computer-readable instructions stored therein that when executed cause the one or more processors 101 to perform a series of steps. For example, some steps of the redeployment module 110 can be responsive to user selection of a web application from the list of the first set of web applications. The web application from the list of the first set of web applications thereby can define a first selected web application. Responsive to user selection of the first selected web application, for example, the steps can include determining a domain and server in the test environment configured to host the first selected web application upon redeployment. The domain and server thereby can define a redeployment test destination. Advantageously, determining the redeployment test destination thereby can serve as a human error evasion feature. The steps can then include, for instance, redeploying the first selected web application to the redeployment test destination. Redeploying the first selected web application to the redeployment test destination advantageously thereby can reduce redeployment time. The steps can further include determining whether the redeployment to the redeployment test destination was successful. Further, the steps can include generating a notification to indicate that the first selected web application is in test by use of the electronic user interface 106 when the redeployment to the redeployment test destination was successful. Similarly, the steps can include sending an electronic message to the one of the plurality of users to indicate that the first selected web application is in test when the redeployment to the redeployment test destination was successful.

In addition, some steps of the redeployment module 110 can be responsive to user selection of a web application from the list of the second set of web applications. The web application from the list of the second set of web applications thereby can define a second selected web application. For example, responsive to user selection of the second selected web application, the steps can include determining a domain and server in the production environment configured to host the second selected web application upon redeployment. The domain and server thereby can define a redeployment production destination, for example. Determining the redeployment production destination advantageously thereby can serve as a human error evasion feature. Further, the production environment can be configured to be different than the test environment. The steps can then include redeploying the second selected web application to the redeployment production destination. Advantageously, redeploying the second selected web application to the redeployment production destination thereby can reduce redeployment time and control deployment to the production environment. That is, because the list of the second set of web applications can be limited to librarian users, the ability to deploy web applications to the production environment can be limited to librarian users. The steps further can include determining whether the redeployment to the redeployment production destination was successful. Still further, the steps can include generating a notification to indicate that the second selected web application is in production by use of the electronic user interface 106 when the redeployment to the redeployment production destination was successful. The steps also can include sending an electronic message to the one of the plurality of users to indicate that the second selected web application is in production when the redeployment to the redeployment production destination was successful.

A system according to an embodiment also can include smart recovery features. In some circumstances, for example, redeploying the first selected web application can include replacing a prior version of the first selected web application. Similarly, redeploying the second selected web application can include replacing a prior version of the second selected web application. In addition, in some instances, the redeployment module 110 further can include computer-readable instructions stored therein that when executed cause the one or more processors to perform the steps of archiving the prior version of the first selected web application when redeployment of the first selected web application was successful and archiving the prior version of the second selected web application when redeployment of the second selected web application was successful.

In other circumstances, redeploying the first selected web application can include deploying the first selected web application while continuing to operate a prior version of the first selected web application. Likewise, redeploying the second selected web application can include deploying the second selected web application while continuing to operate a prior version of the second selected web application.

Further, the test environment can include a functional testing environment and an operational testing environment, and the plurality of web applications can be related to one or more of the following: petroleum engineering and petroleum exploration. The plurality of web applications also can be one or more of the following: J2EE web applications and .NET web applications. In some circumstances, only a predetermined and limited number of web applications can be permitted to be redeployed to the production environment within a predetermined time period. For example, the predetermined and limited number of web applications can be two web applications, and the predetermined time period can be one week. Conversely, an unlimited number of web applications can be permitted to be redeployed to the test environment, in some instances. Additionally, each of the first set of web applications can have been deployed previously in at least an initial deployment responsive to action associated with one or more administrator roles. Similarly, each of the second set of web applications can have been deployed previously in at least an initial deployment responsive to action associated with the one or more administrator roles. Further, redeploying the first selected web application to the redeployment test destination can be independent of action associated with the one or more administrator roles, and redeploying the second selected web application to the redeployment production destination similarly can be independent of action associated with the one or more administrator roles. These features can enable developer users and librarian users, for example, to redeploy web applications in certain circumstances without relying on the actions of system administrators, for example.

In some instances, each of the first set of web applications can be configured to be displayed to only one user having a user identifier that includes an indicator that the associated user is one of the one or more developer users associated with the respective web application at a time. This feature, for example, can prevent two or more co-developers of a single web application from attempting to redeploy their commonly developed web application at the same time. Further, the redeployment module further can include computer-readable instructions stored therein that when executed cause the one or more processors to perform the steps of—when a redeployment was unsuccessful—generating a notification to indicate that redeployment failed by use of the electronic user interface 106 and sending an electronic message to the one of plurality of users to indicate that the redeployment failed. These notifications can enable the user to decide whether to begin the redeployment process again.

For example, individuals in developer roles, librarian roles, and administrator roles can be part of the same entity, as illustrated, for instance, in FIG. 1. As depicted, for example, developers can be organized into divisions, such as Division A 320, Division B 330, and Division C 340. The entity also can include a plurality of other divisions, in some instances, such as Division y 350. Further, each division can be supported by one set of administrators 310. For example, administrators 310 can include Administrator 1 3101, Administrator 2 3102, Administrator 3 3103, Administrator 4 3104, and Administrator 5 3105. Within each division, for example, a set of librarians, e.g., two to three librarians, can serve in a librarian role for the developers of the respective division. For example, Division A 320 can include three librarians: Librarian A1 3201, Librarian A2 3202, and Librarian A3 3203. All three of these depicted librarians for Division A 320 can support the developers of Division A 320, including Developer A1 3204, Developer A2 3205, Developer A3 3206, and other developers through Developer Ax 3207. Each developer can create or otherwise work on one or more web applications, e.g., Application 1 3208 and Application 2 3209. Further, more than one developer can work on a single application. As illustrated, for instance, both Developer A1 3204 and Developer A2 3205 can work on Application 1 3208. However, a single developer can work on an application, as well, such as the work of Developer A3 3206 on Application 2 3209. Similarly to Division A 320, Division B 330 can include librarians, such as Librarian B1 3301 and Librarian B2 3302, who can support the developers of Division B 330. For example, Division B 330 can include Developer B1 3304, Developer B2 3305, Developer B3 3306, and so on through Developer Bx 3307. The developers can work on a variety of web applications, including Application 3 3308 and Application 4 3309, through Application z 3310. For instance, Developer B1 3304 is depicted as working on Application 3 3308 with Developer B2 3305, who is also depicted as working on Application 4 3309 with Developer B3 3306. Division C 340 and other divisions through Division y 350 can similarly include developers and librarians.

Figure 3:
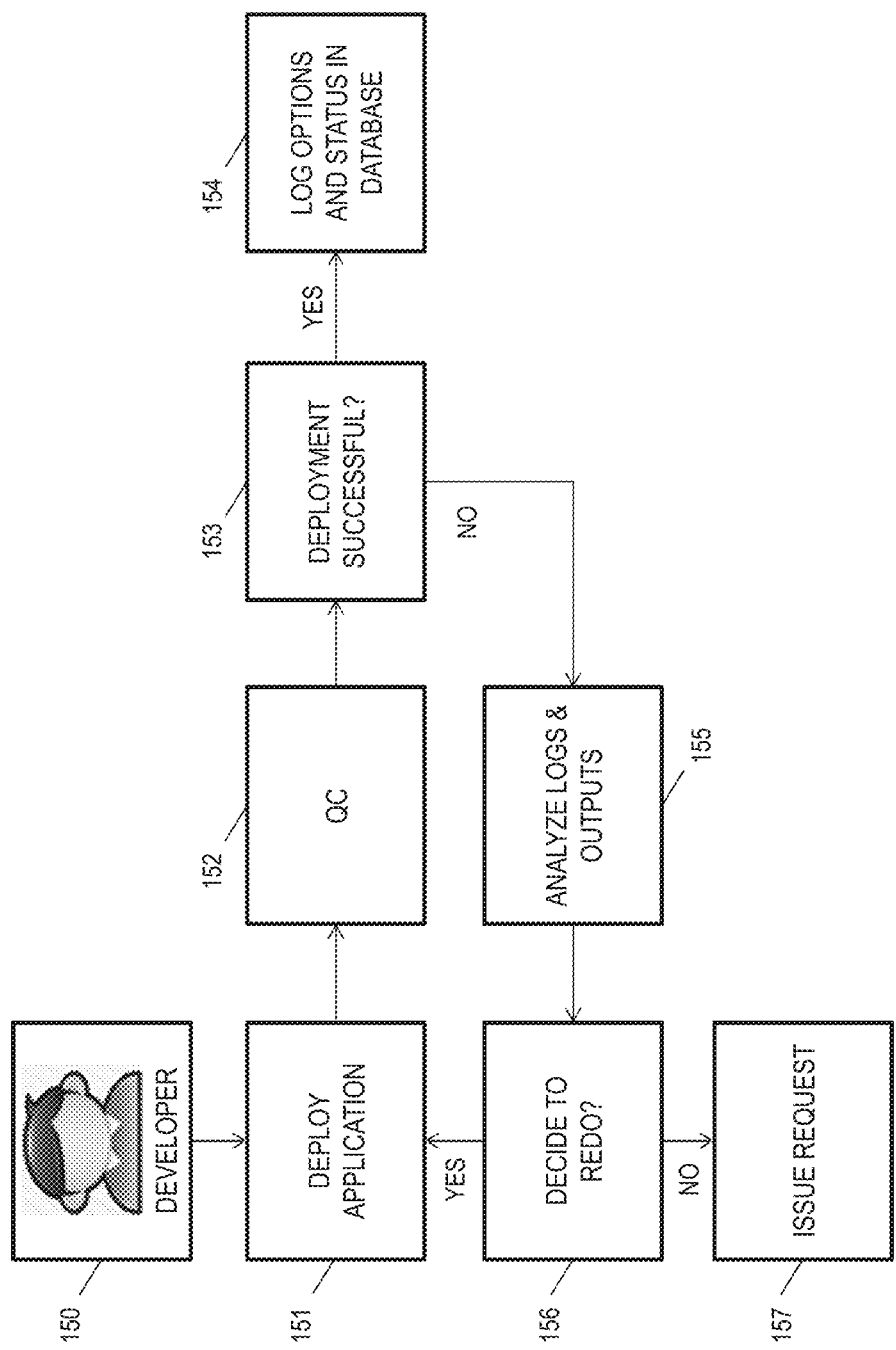
FIG. 3 is a schematic diagram of a method according to an embodiment of the invention.

Embodiments of the invention thus advantageously can empower developers to redeploy applications without the assistance of system administrators in certain circumstances, for example. For instance, as illustrated in FIG. 3, a developer 150 can redeploy one of the developer's web applications 151 without action by a system administrator. After quality control (QC) 152, a system according to an embodiment, for example, can determine whether the deployment was successful 153. If the deployment was successful 153, the system can log options and the web application's deployment status in a database 154, such as the one or more databases 102, for example. If the deployment was unsuccessful 153, however, the developer 150 can then analyze the logs and outputs 155 from the system and decide whether to redo the redeployment process 156. If the developer 150 decides to redo the redeployment process 156, for example, the developer 150 again can redeploy the web application 151. If the developer 150 decides against redoing the redeployment process 156, however, the system can issue a request 157, such as a request to a help desk or to a system administrator to assist with the redeployment process, for example.

Moreover, embodiments of the invention can effect a change in a computer or system and further can improve its functioning. For example, a system according to an embodiment of the invention can redeploy a web application, i.e., "undeploy" an existing version of a web application and replace the earlier version with a newer version of the web application. As a result of this redeployment process, the system has changed: it now includes a different version of the deployed web application. Furthermore, the system also now can feature additional functionality as a result of the updated web application's deployment. Such additional functionality can improve the functioning of the system, in some circumstances. In addition, the functioning of the system can be improved by other advantageous features of the invention, including blocking access to initial deployment of web applications to some users while allowing the same users to redeploy some of the web applications, in certain circumstances. The functioning of the system also can be improved by determining a domain and server in the respective environment to host a selected web application upon redeployment.

Figure 9:
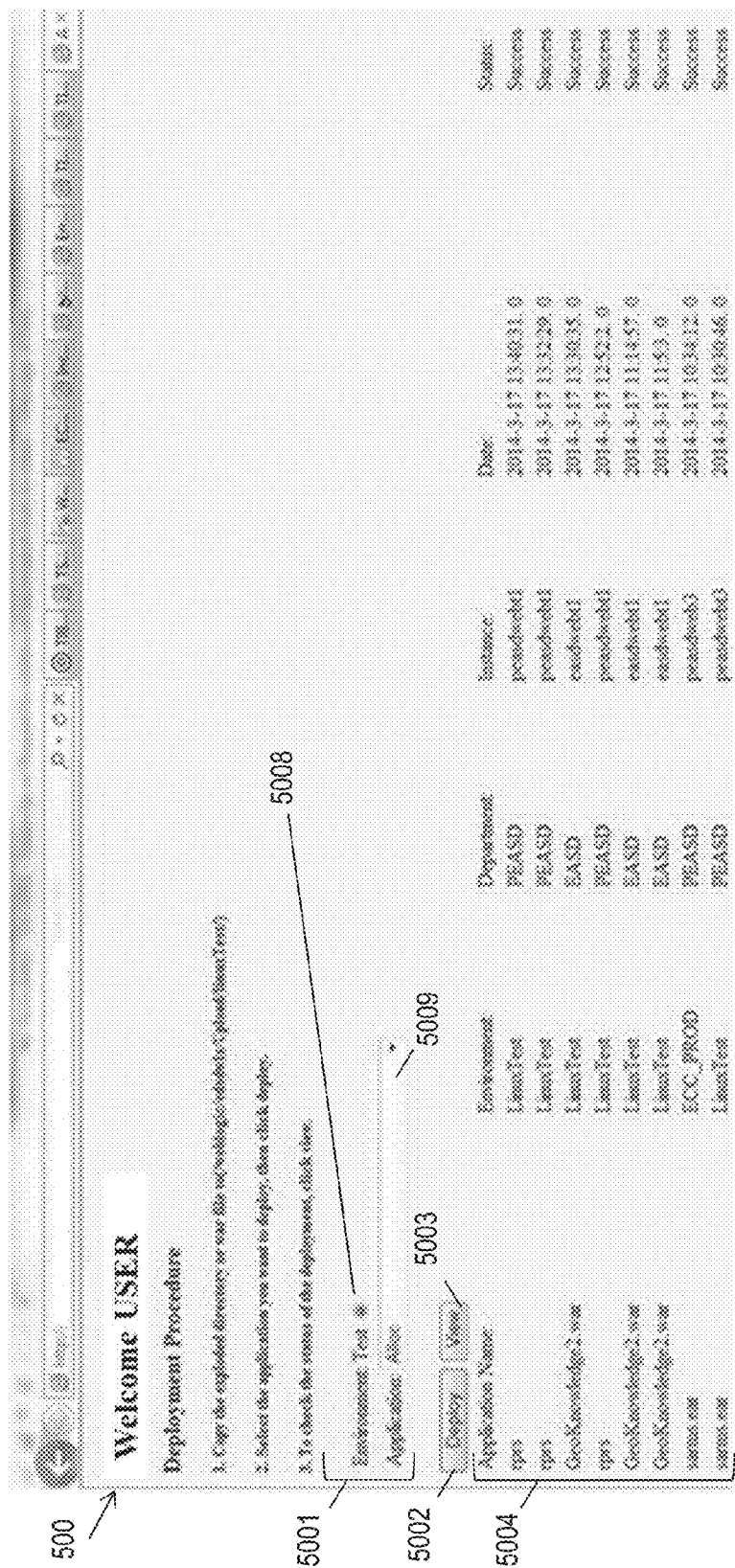
FIG. 9 is a schematic diagram of an electronic interface according to an embodiment of the invention.

An exemplary embodiment 500 of an electronic user interface 106 is illustrated in FIGS. 9-15, for example. The interface 500, for example, can include a region 5001 to indicate a selected web application and the intended deployment environment for the respective selected web application, as illustrated in FIG. 9, for example. Consequently, region 5001 can display, for example, lists of the first and second sets of web applications that are eligible for redeployment. Region 5001 can include, for instance, one or more deployment environment selection options 5008 and a drop-down list of web applications that are candidates for redeployment 5009, as further illustrated in FIG. 11, for example. Further, the interface 500 can include, for example, a Deploy button 5002 and a View button 5003, as a well a region 5004 to display a list of web applications and associated data, as illustrated in FIG. 9, for example. The list of web applications and associated data displayed in region 5004 can include, for instance, an application's name, current deployment status, current deployment environment, associated department, instance, deployment date, and successfulness of most recent deployment. Further, a Deploy button 5002 can be configured to initiate deployment of a selected web application responsive to user selection, for example. Likewise, a View button 5003 can be configured to display a list of web applications that are available for redeployment or that have been redeployed—either successfully or unsuccessfully—responsive to user selection, for example.

Figure 10:
FIG. 10 is a schematic diagram of an electronic interface according to an embodiment of the invention.
Figure 11:
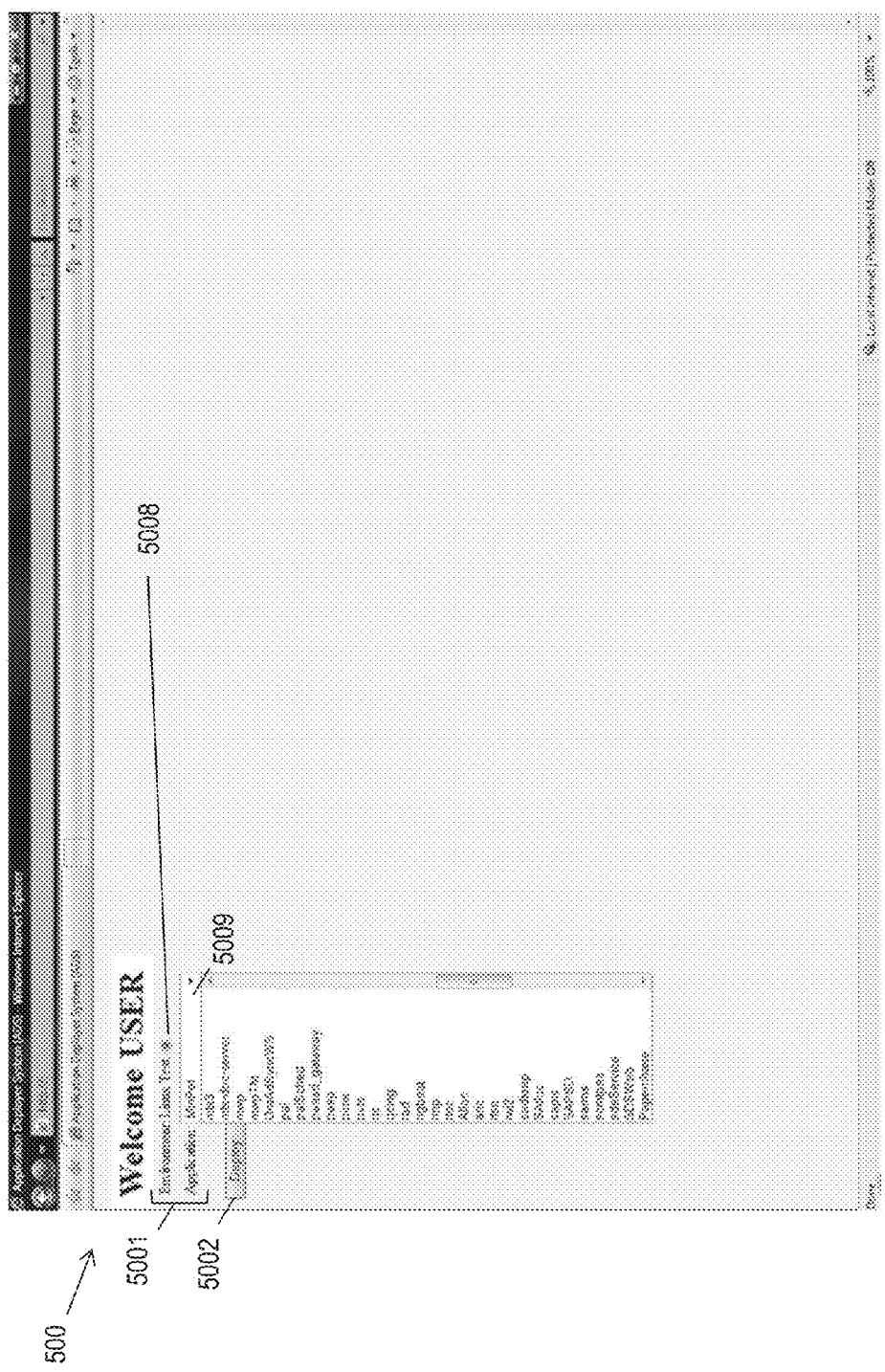
FIG. 11 is a schematic diagram of an electronic interface according to an embodiment of the invention.
Figure 12:
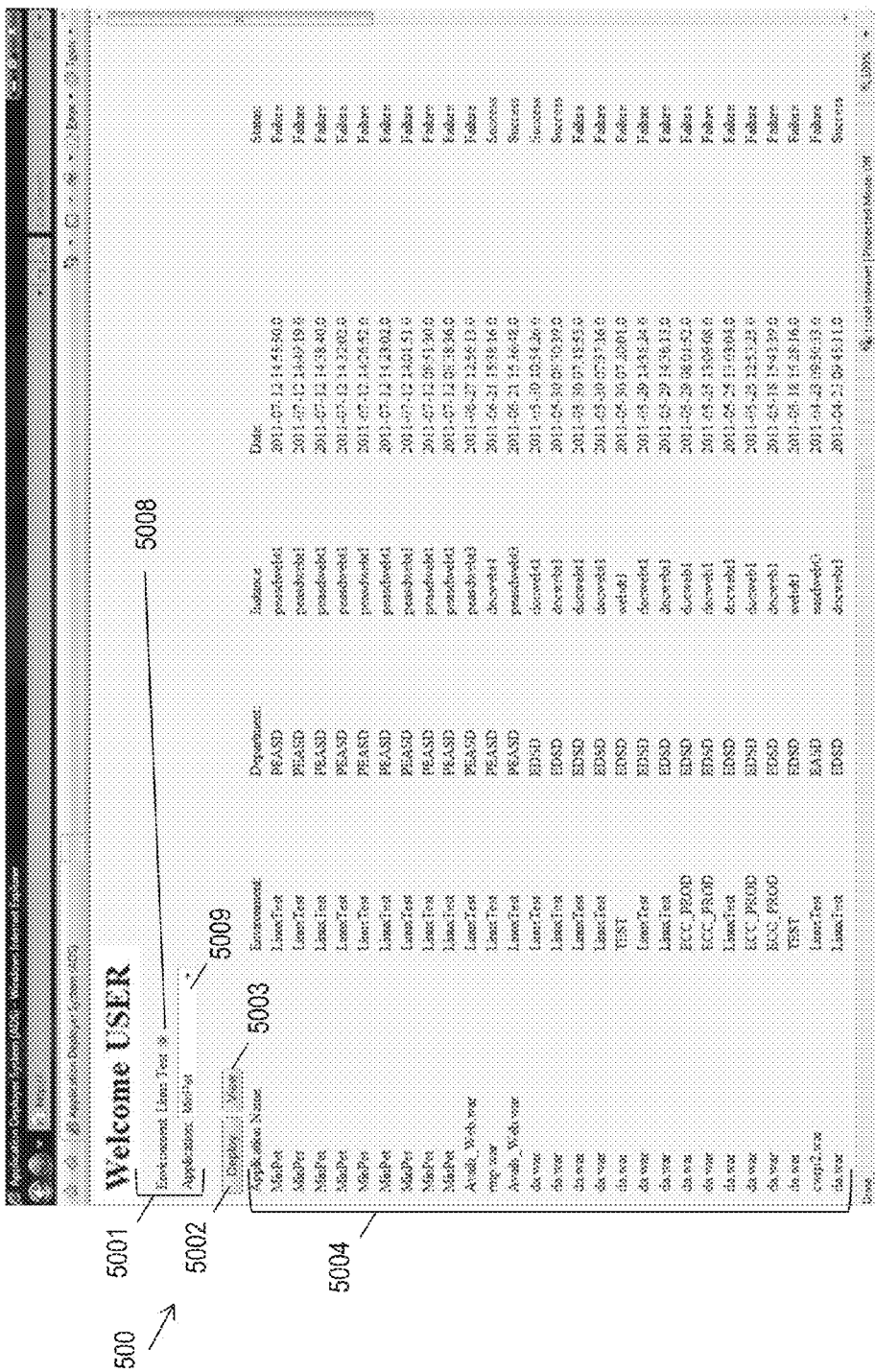
FIG. 12 is a schematic diagram of an electronic interface according to an embodiment of the invention.
Figure 13:
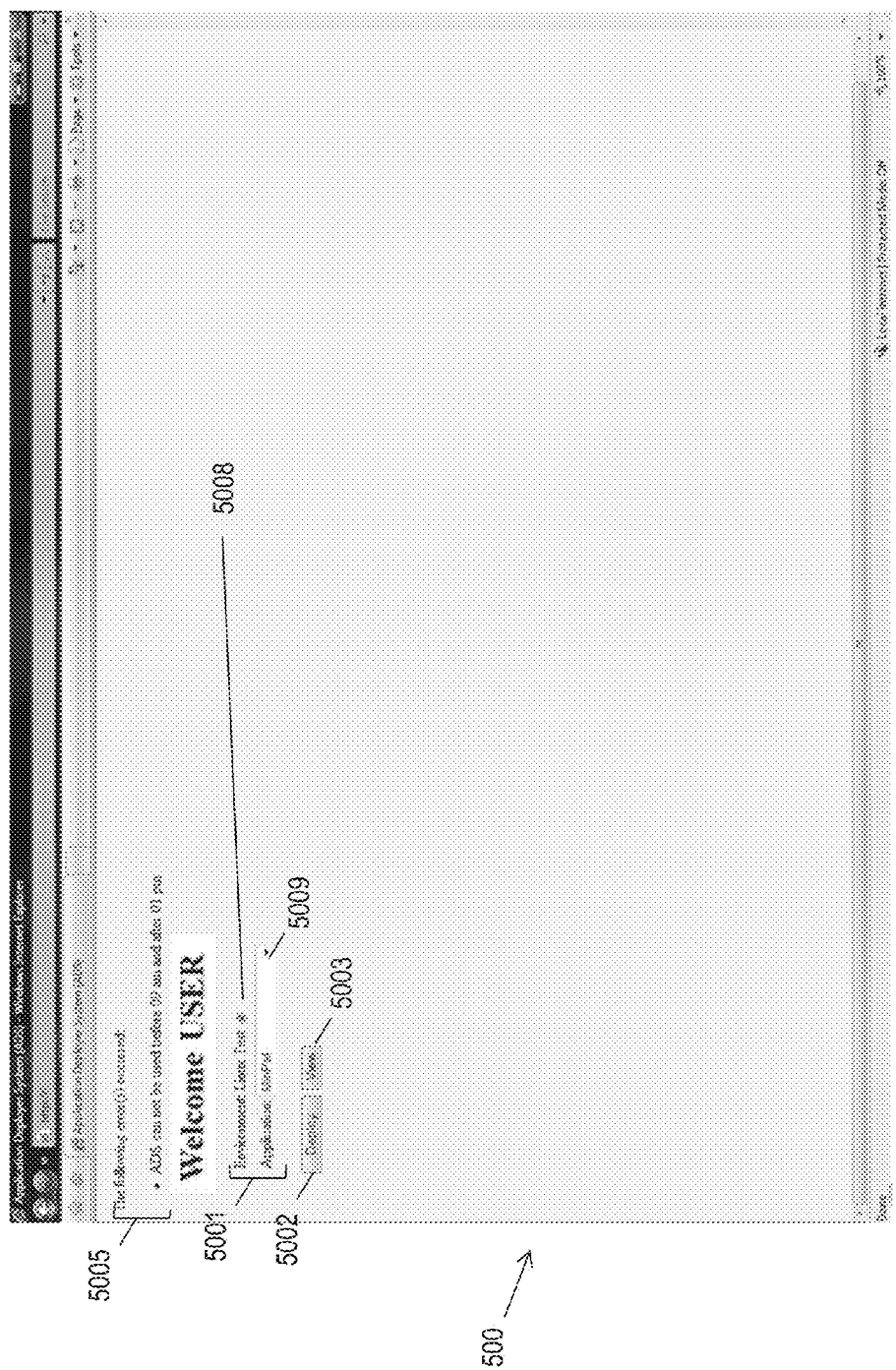
FIG. 13 is a schematic diagram of an electronic interface according to an embodiment of the invention.
Figure 14:
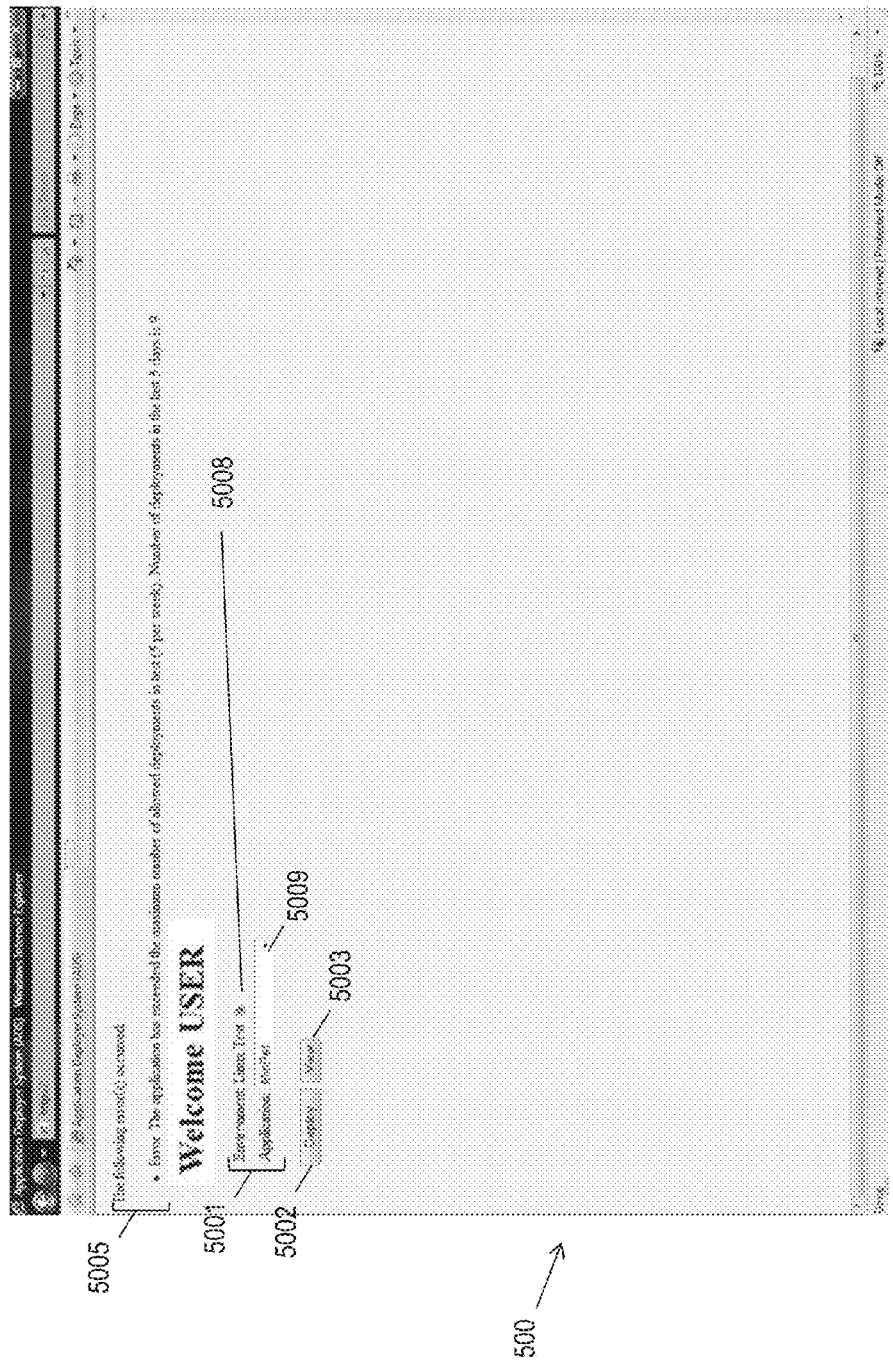
FIG. 14 is a schematic diagram of an electronic interface according to an embodiment of the invention.
Figure 15:
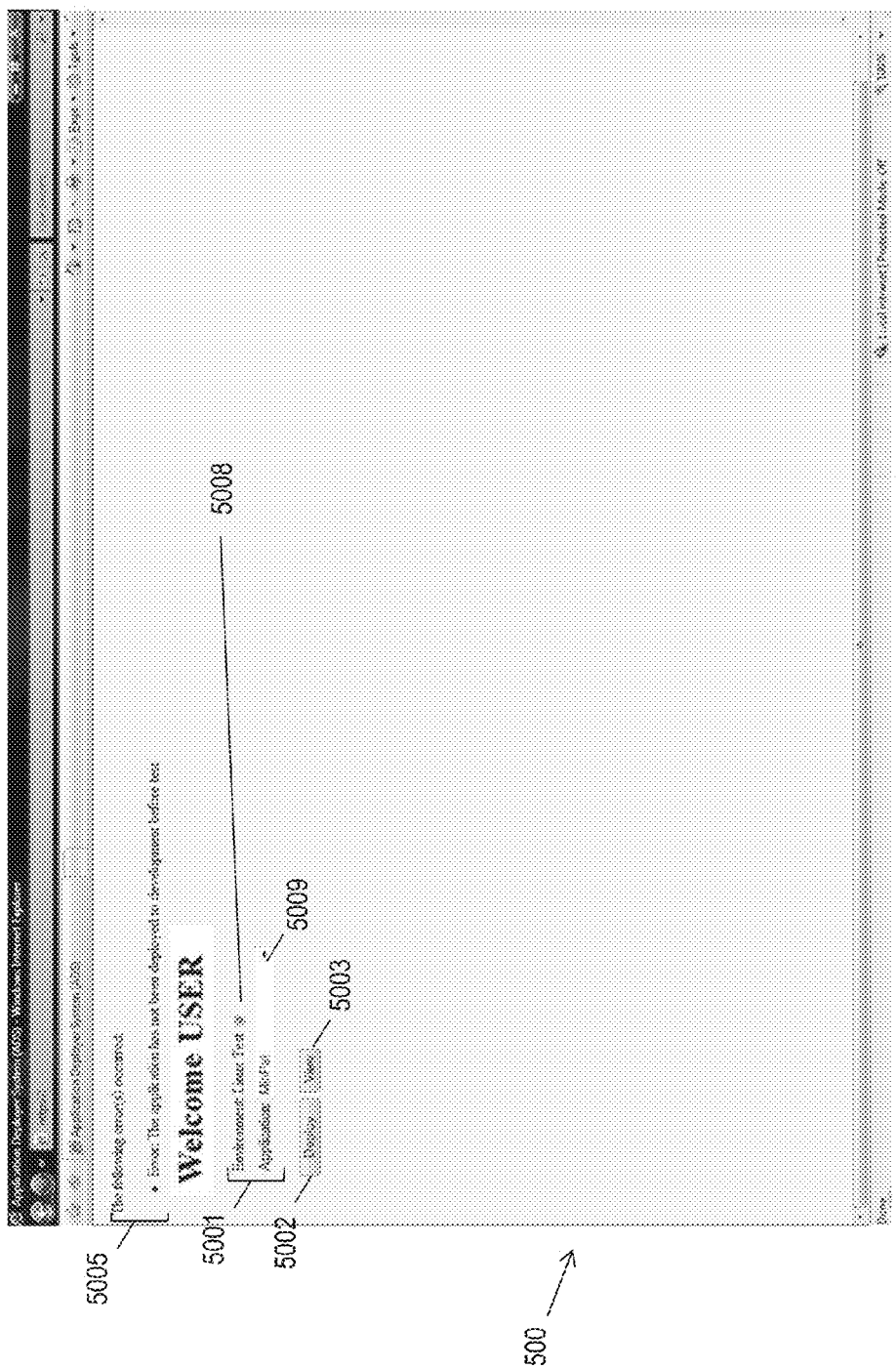
FIG. 15 is a schematic diagram of an electronic interface according to an embodiment of the invention.

For example, an interface 500 can initially display a region 5001, a Deploy button 5002, and a View button 5003, as illustrated, for instance, in FIG. 10. A user then can select a web application, e.g., from a drop-down menu 5009 in region 5001, as illustrated in FIG. 11, for example. After selecting a web application, a user can select, for example, a Deploy button 5002. Responsive to a user's selection of the Deploy button 5002, e.g., by clicking on the Deploy button 5002, a method for deploying the application can be called, for example. If deployment is unsuccessful, the interface 500 can display a notification. For example, as illustrated in FIG. 13, a region 5005 can provide status information, including, for example, a notification that a deployment failed due to restrictions on the time of day in which deployments are permitted (e.g., deployments can be permitted only between 9 AM and 1 PM). In another example, region 5005 can include a notification that a deployment failed due to restrictions on the permitted number of deployments in a preselected time period (e.g., only five deployments permitted per week), as illustrated in FIG. 14, for instance. In yet another example, region 5005 can include a notification that a deployment failed due to application lifecycle requirements (e.g., an application must be deployed to development before test), as illustrated in FIG. 15, for instance. A user also can select the View button 5003, for instance; as a result, a list of web applications and associated data can be displayed in region 5004, as illustrated in FIG. 12, for example. Responsive to a user's selection of the View button 5003, e.g., by clicking on the View button 5003, a method for updating the status of a deployment can be called, for example.

Figure 17:
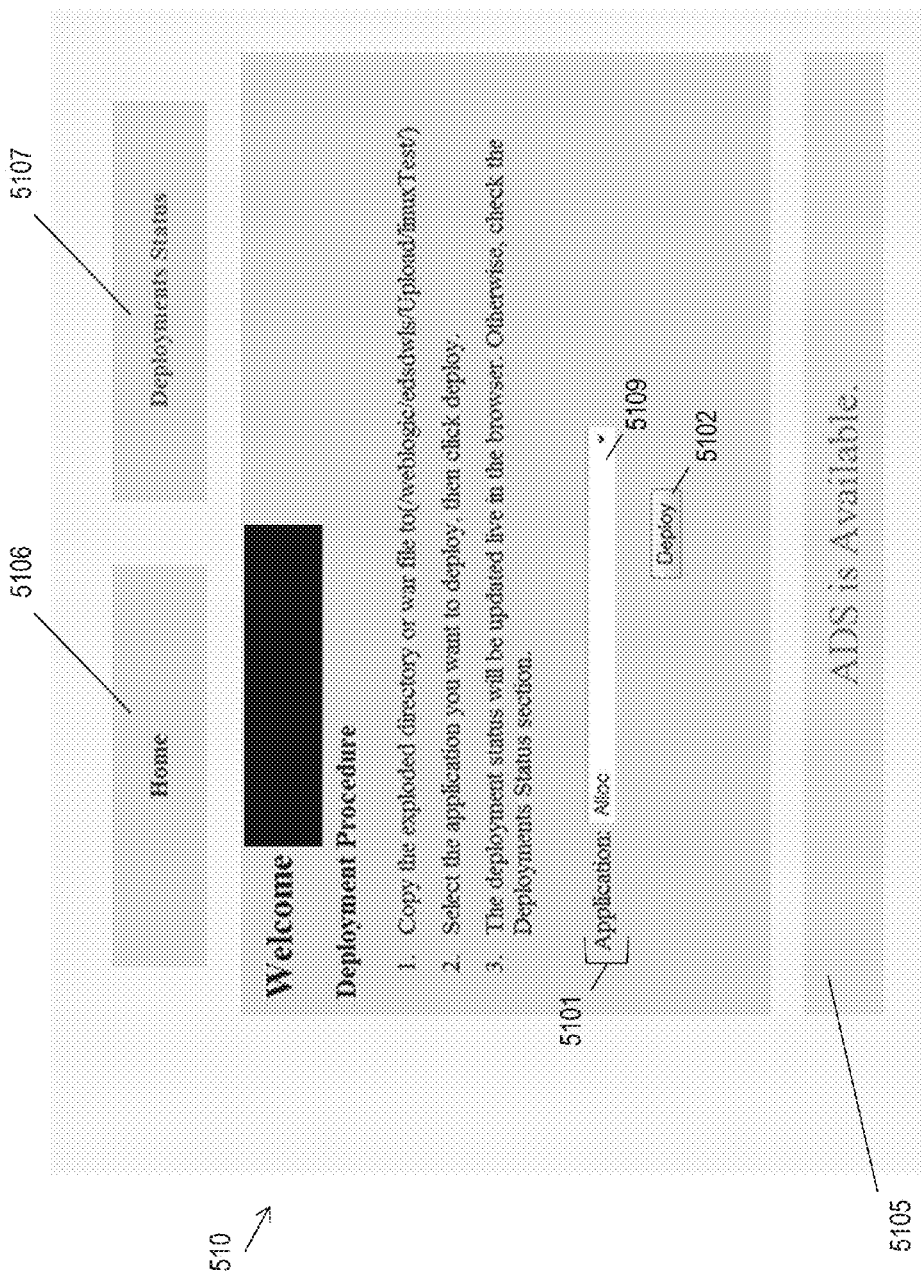
FIG. 17 is a schematic diagram of an electronic interface according to another embodiment of the invention.
Figure 18:
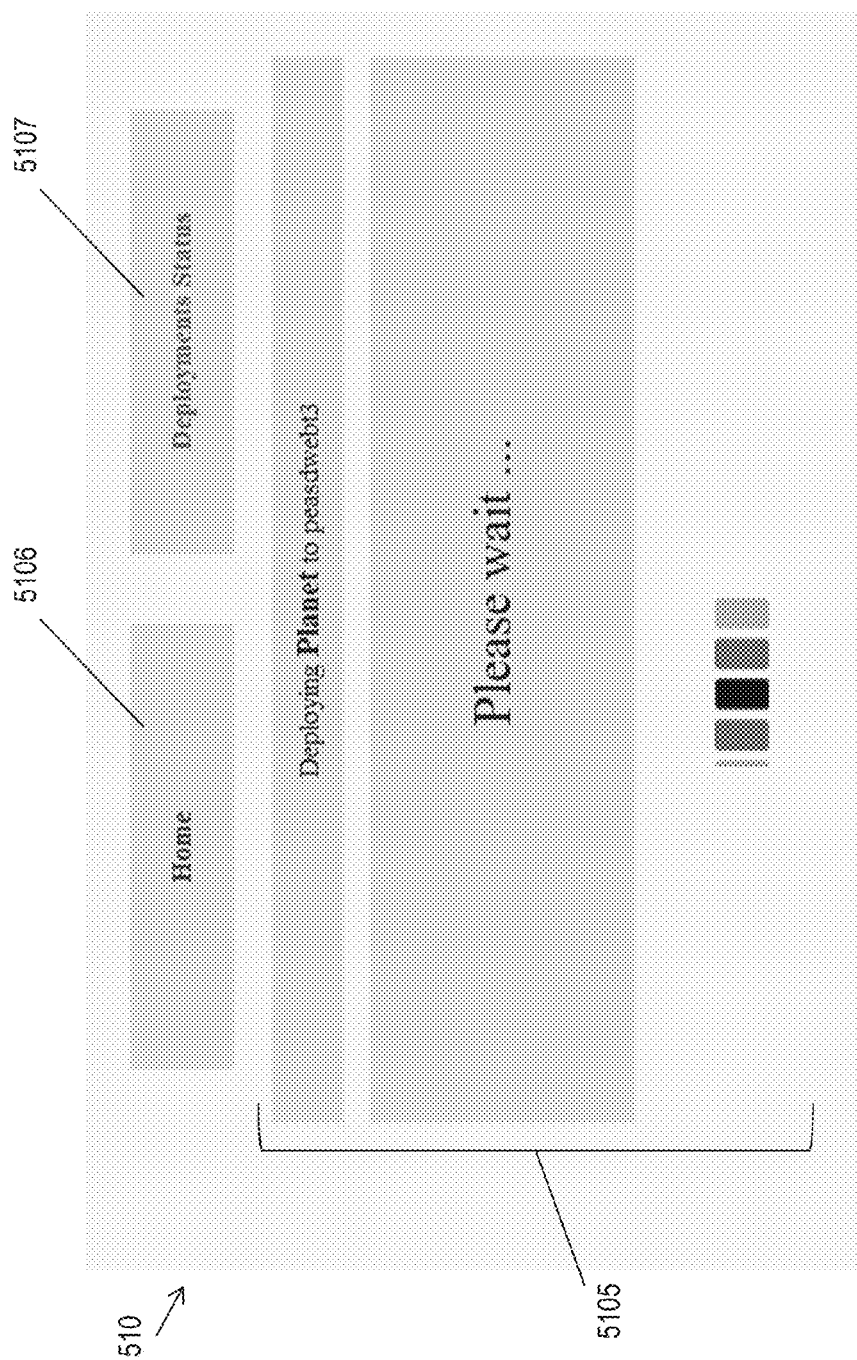
FIG. 18 is a schematic diagram of an electronic interface according to another embodiment of the invention.
Figure 19:
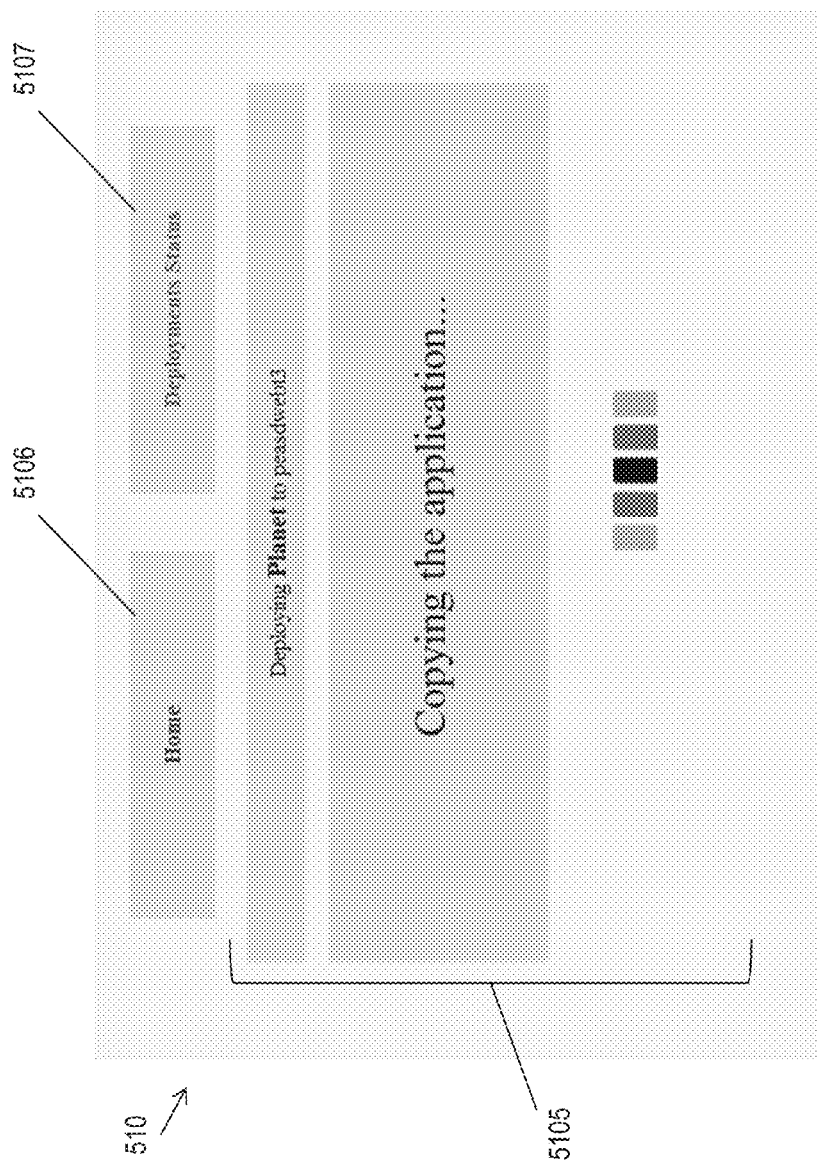
FIG. 19 is a schematic diagram of an electronic interface according to another embodiment of the invention.
Figure 20:
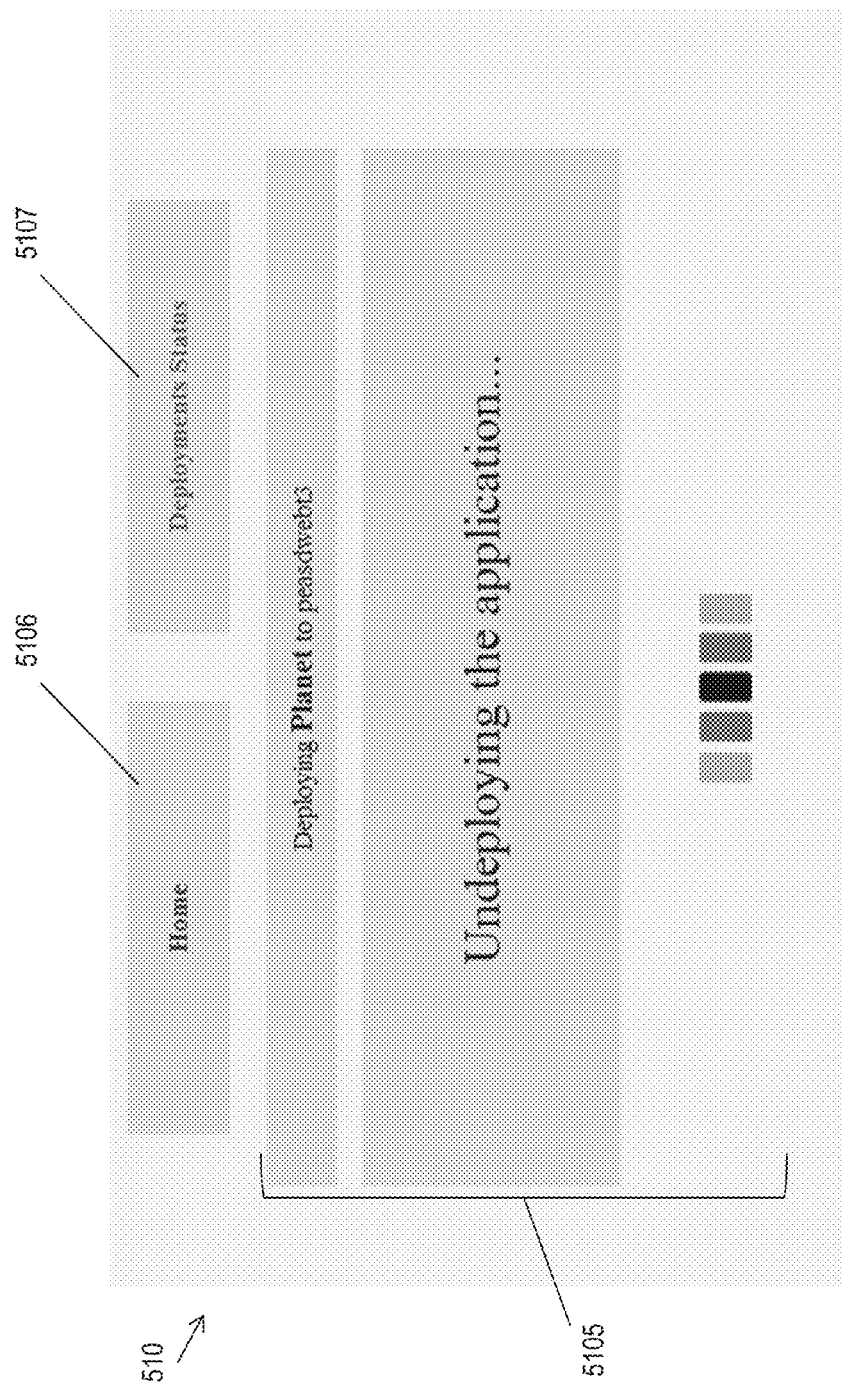
FIG. 20 is a schematic diagram of an electronic interface according to another embodiment of the invention.
Figure 21:
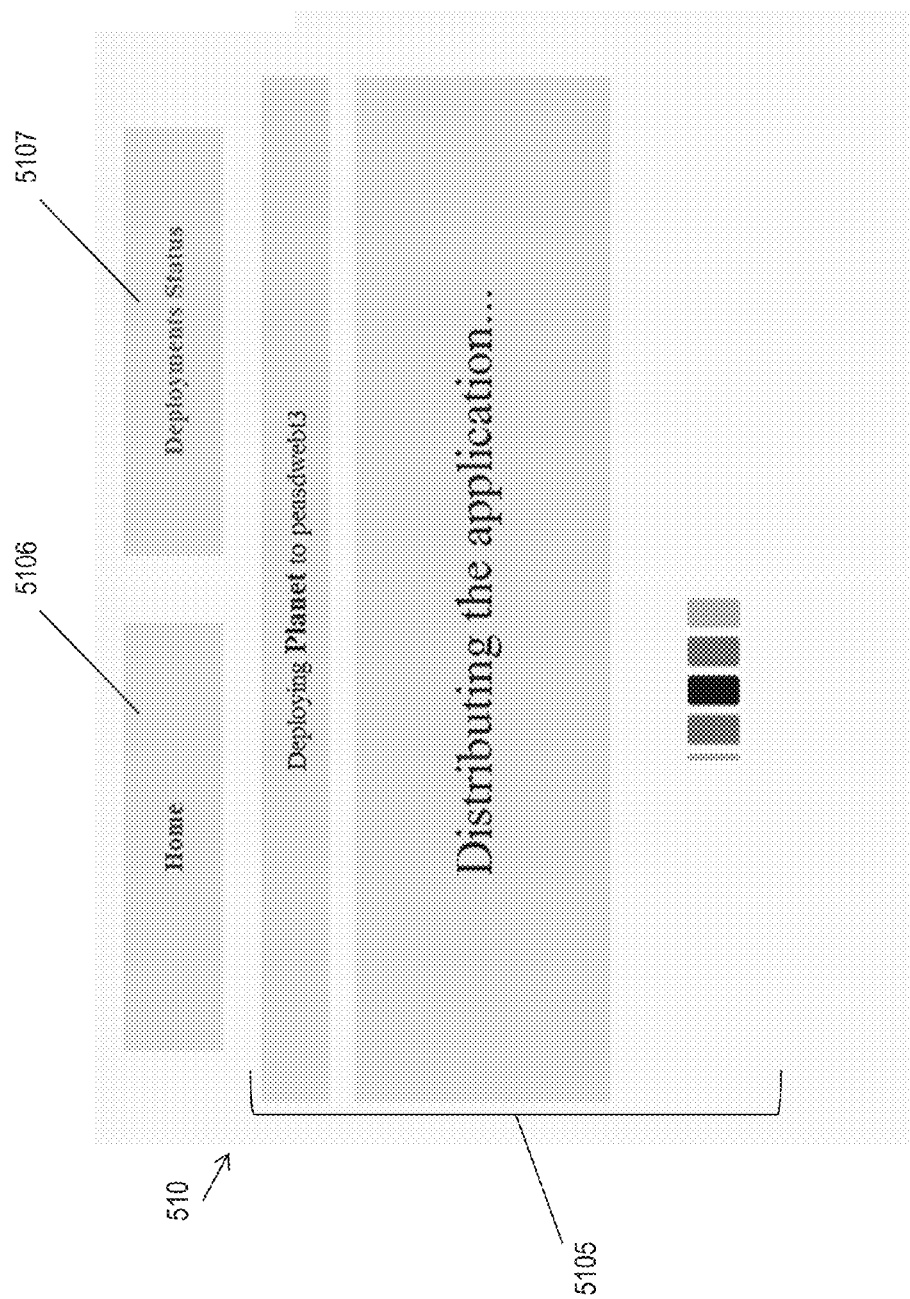
FIG. 21 is a schematic diagram of an electronic interface according to another embodiment of the invention.
Figure 22:
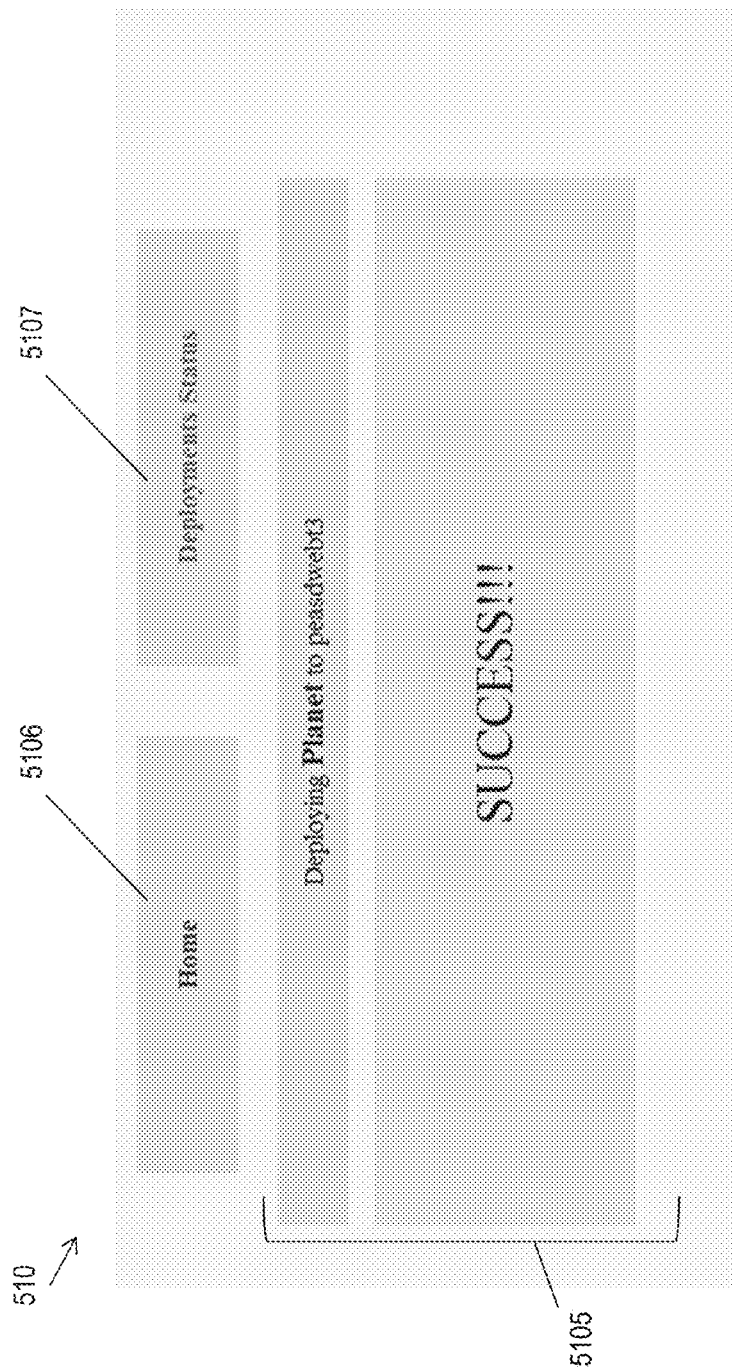
FIG. 22 is a schematic diagram of an electronic interface according to another embodiment of the invention.
Figure 27:
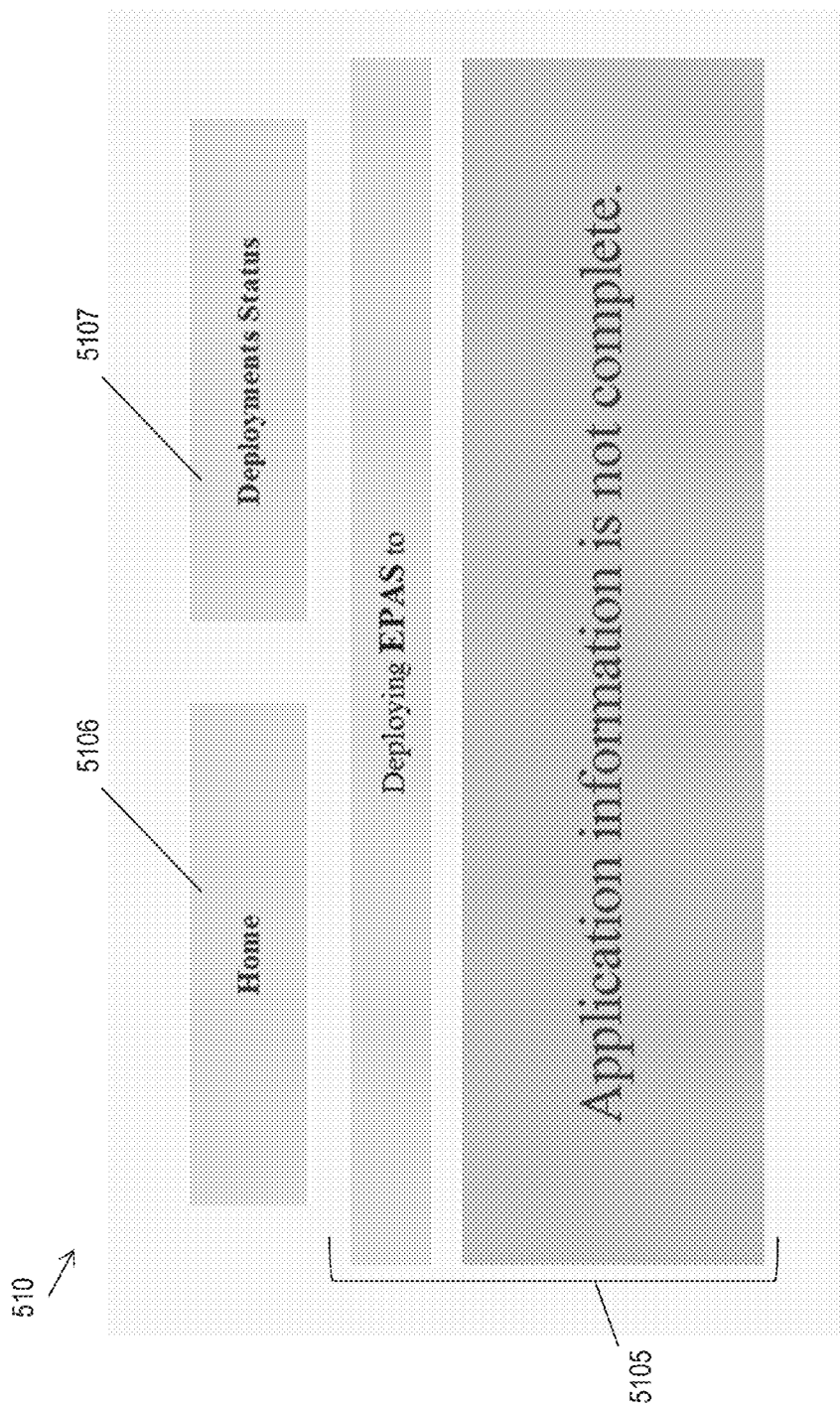
FIG. 27 is a schematic diagram of an electronic interface according to another embodiment of the invention.

Another exemplary embodiment 510 of an electronic user interface 106 is illustrated in FIGS. 17-27, for example. Similarly to interface 500, for example, an interface 510 can include a region 5101 to indicate a selected web application, as illustrated in FIG. 17, for example. Consequently, region 5101 can display, for example, lists of the first and second sets of web applications that are eligible for redeployment. Region 5101 can include, for instance, a drop-down list of web applications that are candidates for redeployment 5109. Further, the interface 510 can include, for example, a Deploy button 5102, a Home button 5106, and a Deployments Status button 5107. The interface 510 also can include a region 5105 that can provide status information, such as system availability, e.g., "ADS is Available," as illustrated in FIG. 17. Additional examples of status information that can be provided in region 5105 can include, for example, the progress of a redeployment of a web application (e.g., a web application called "Planet" to an intended deployment environment called "peasdwebt3"), as illustrated in FIGS. 18-22. For example, region 5105 can display: "Please wait . . . " (e.g., as illustrated in FIG. 18); "Copying the application . . . " (e.g., as illustrated in FIG. 19) to indicate that the web application's associated data is being copied; "Undeploying the application . . . " (e.g., as illustrated in FIG. 20) to indicate that an earlier version of the web application is being undeployed; "Distributing the application . . . " (e.g., as illustrated in FIG. 21); and "SUCCESS!!!" (e.g., as illustrated in FIG. 22) to indicate that the web application has been redeployed successfully. In addition, region 5105 can indicate the status of a redeployment that fails, as illustrated in FIG. 27, for example. As depicted, for instance, the attempted redeployment of web application called "EPAS" has failed because the submitted information about the EPAS web application is incomplete. More specifically, after an initial deployment, an error message, e.g., as illustrated in FIG. 27, can be displayed when information regarding the application has not been correctly completed and stored in a database.

Figure 23:
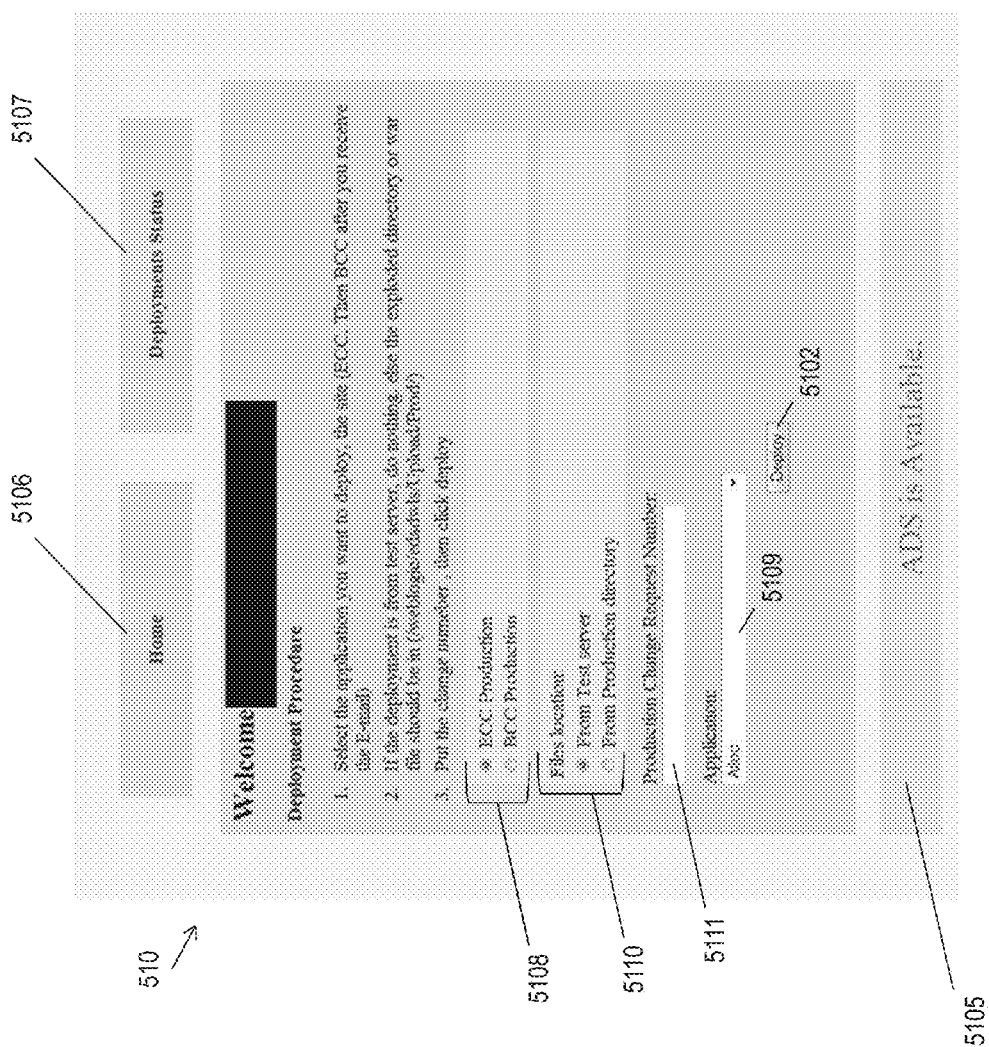
FIG. 23 is a schematic diagram of an electronic interface according to another embodiment of the invention.

Further, responsive to user selection of the Home button 5106, for example, an interface 510 can initially display a region 5105, one or more deployment environment selection options 5108, one or more file locations 5110, an option for a user to enter a production change request number 5111, a drop-down list of web applications that are candidates for redeployment 5109, and a Deploy button 5102, as illustrated in FIG. 23, for example. The one or more deployment environment selection options 5108 can include, for example, two production deployment environments, e.g., "ECC Production" and "BCC Production," as depicted. Further, the one or more file locations 5110 can enable a user to select that the desired web application's associated information (including files) is currently stored on a test server. For example, files can be stored on a test server when a web application is currently deployed to a test environment. In addition, the one or more file locations 5110 can enable a user to select that the desired web application's associated information (including files) is currently stored in a production directory, such as when a web application is currently deployed to a production environment. A Deploy button 5102 can be configured to initiate deployment of a selected web application responsive to user selection, for example.

Figure 24:
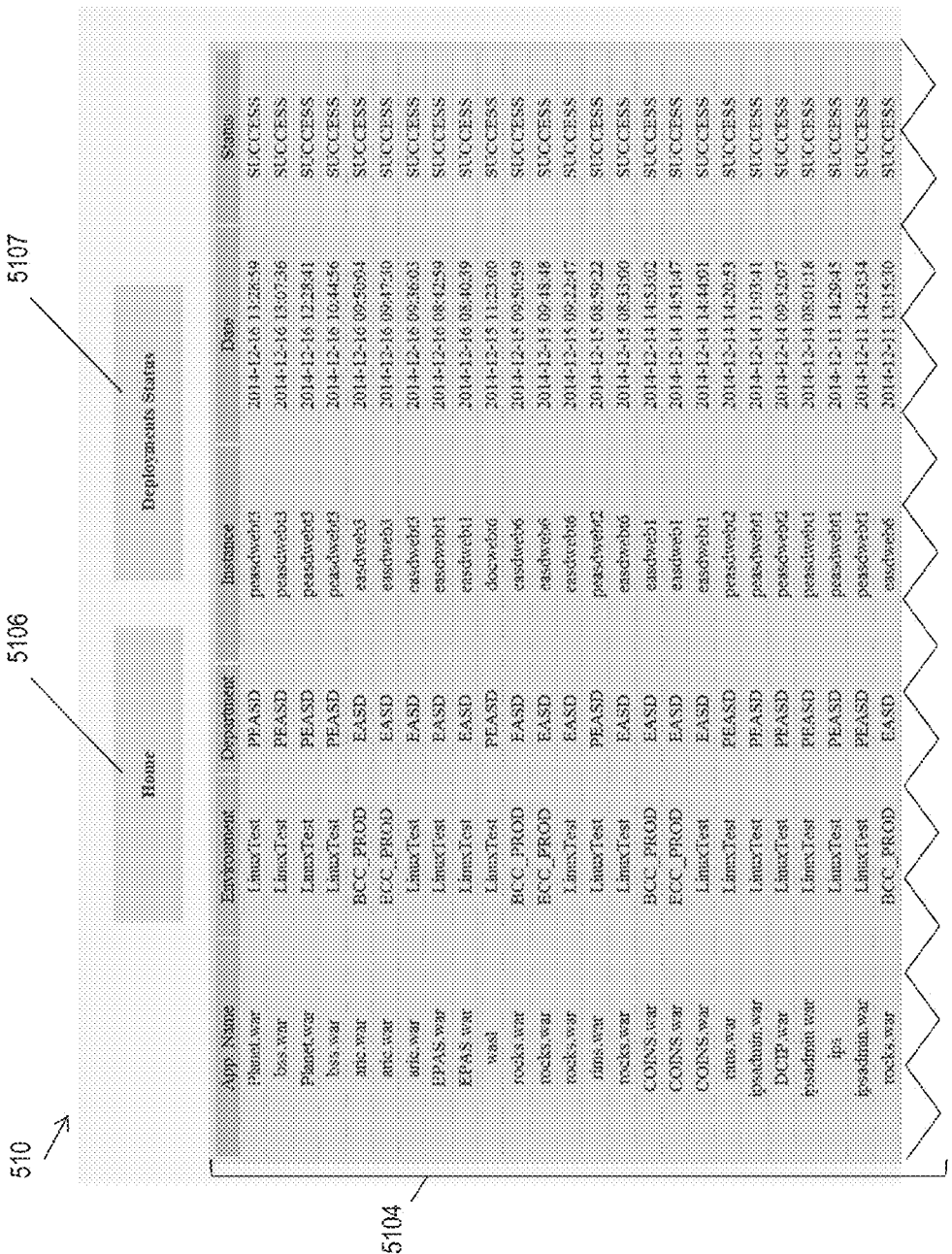
FIG. 24 is a schematic diagram of an electronic interface according to another embodiment of the invention.
Figure 25:
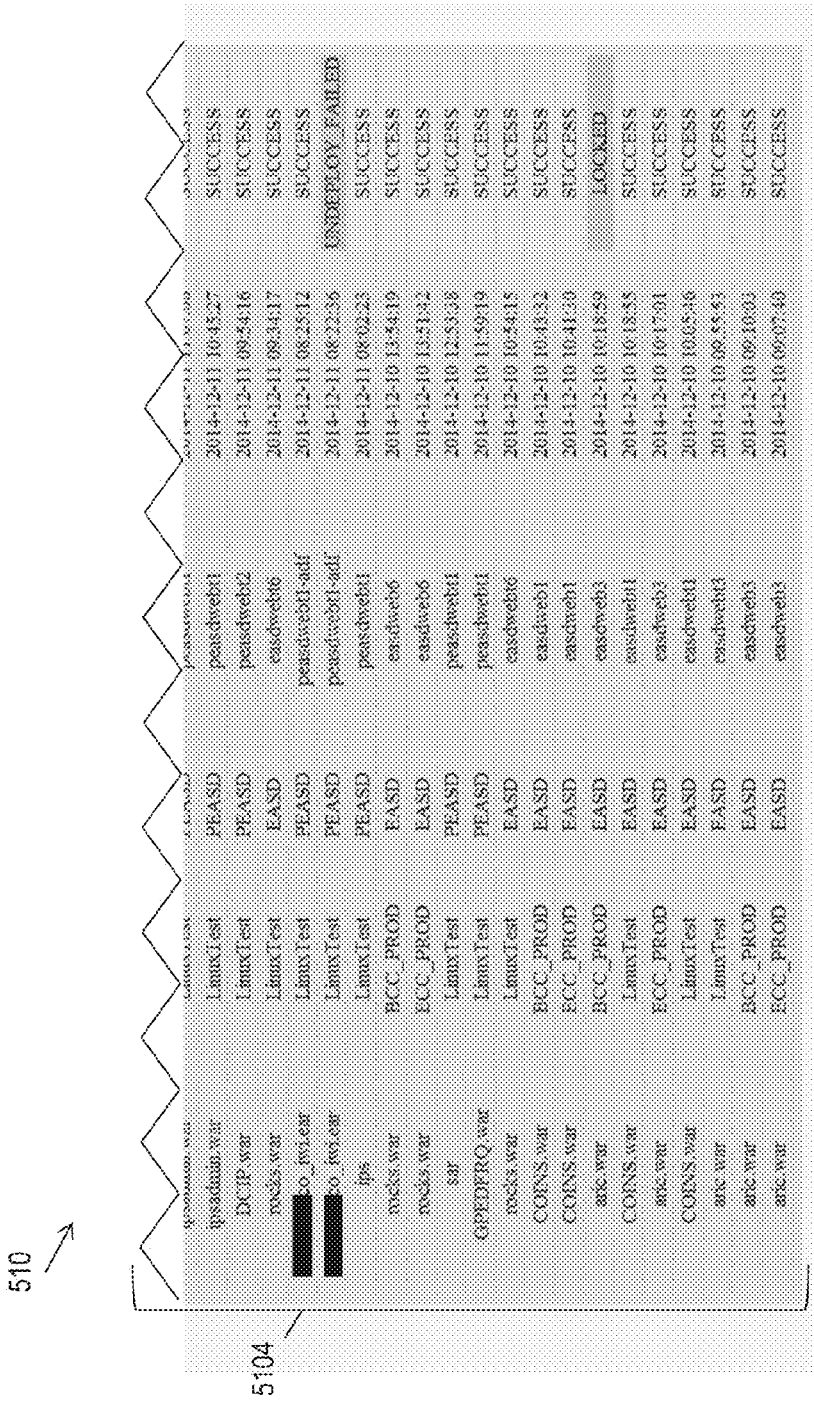
FIG. 25 is a schematic diagram of an electronic interface according to another embodiment of the invention.
Figure 26:
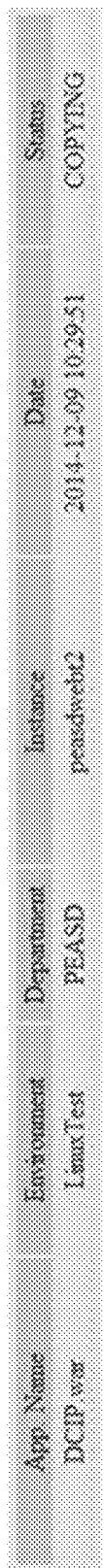
FIG. 26 is a schematic diagram of an electronic interface according to another embodiment of the invention.

Additionally, responsive to user selection of the Deployments Status button 5107, for example, an interface 510 can display a region 5104 to display a list of web applications and associated data, as illustrated in FIG. 24 and continuing into FIG. 25, for example. The list of web applications and associated data displayed in region 5104 can include, for instance, an application's name, current deployment environment, associated department, instance, deployment date, and successfulness of most recent deployment. For example, all of the web applications on the list depicted in FIG. 24 can indicate that the most recent redeployment was successful. In contrast, one of the web applications on the list depicted in FIG. 25 (i.e., "co_iwi.ear," associated with time 2014 Dec. 11 08:22:36) can indicate that the most recent redeployment attempt failed. Similarly, one of the web applications on the list depicted in FIG. 25 (i.e., "aric.war," associated with time 2014 Dec. 10 10:18:59) can indicate that the most recent redeployment attempt resulted in a locked redeployment status. In some circumstances, manual intervention by an administrator can be required to redeploy a selected web application, as illustrated, for example, in FIG. 26. As depicted, for example, deployment can include a copying state that can request manual interference by administrators. Consequently, a Deployments Status button 5107 can be similar to a View button 5003 and can be configured to display a list of web applications that are available for redeployment or that have been redeployed—either successfully or unsuccessfully—responsive to user selection, for example.

In some circumstances, such as when a failure occurs as a result of the web hosting environment, and the user attempting deployment of an application can receive the following error message, which can indicate that an administrator needs to investigate the failure:

ERROR: Deployment: DISTRIBUTE command failed . . . quitting Please check log files (/weblogic/test/WLS1211/domains/peasdt/servers/peasdwebt3/logs/*)

Embodiments of the invention also can include computer-implemented methods to enhance redeployment of web applications after initial deployment. For example, a method according to an embodiment can include blocking access to initial deployment of a plurality of web applications to a plurality of users. Each user can be configured to have a user identifier, for example. Further, each of the plurality of web applications can be configured to be associated with a user identifier of one or more of the plurality of users in a web application developer role. The one or more of the plurality of users in a web application developer role thereby can define one or more developer users, for example. In addition, each of the plurality of web applications further can be configured to be associated with a user identifier of a different one or more of the plurality of users in a web application librarian role. The one or more of the plurality of users in a web application librarian role thereby can define one or more librarian users, for example. Further, a librarian role can be configured to indicate authorization to redeploy a web application to a production environment. Each of the plurality of web applications still further can be configured to have an associated current deployment status. For example, current deployment status can include one or more of the following: in development and deployed in a test environment.

A method further can include displaying a list of a first set of one or more web applications of the plurality of web applications to one of the plurality of users. Displaying the list of the first set of one or more web applications can be responsive to a determination that each of the first set of web applications has a current deployment status of in development and that the user identifier associated with the respective one of the plurality of users includes an indicator that the associated user is one of the one or more developer users associated with the respective web application, for example. A method also can include displaying a list of second set of another one or more web applications of the plurality of web applications to the one of the plurality of users. Displaying the list of the second set of one or more web applications can be responsive to a determination that each of the second set of web applications has a current deployment status of deployed in a test environment and that the user identifier associated with the respective one of the plurality of users includes an indicator of a librarian role associated with each of the second set of web applications.

In addition, a method can include steps responsive to user selection of a web application from the list of the first set of web applications thereby to define a first selected web application. For example, steps can include determining a domain and server in the test environment configured to host the first selected web application upon redeployment. The domain and server thereby can define a redeployment test destination, for example. Steps further can include redeploying the first selected web application to the redeployment test destination thereby to reduce redeployment time, as well as determining whether the redeployment to the redeployment test destination was successful. In addition, steps can include generating a notification to indicate that the first selected web application is in test by use of an electronic interface when the redeployment to the redeployment test destination was successful. Similarly, steps can include sending an electronic message to the one of the plurality of users to indicate that the first selected web application is in test when the redeployment to the redeployment test destination was successful.

A method also can include steps responsive to user selection of a web application from the list of the second set of web applications thereby to define a second selected web application. For instance, steps can include determining a domain and server in the production environment configured to host the second selected web application upon redeployment. The domain and server, for example, thereby can define a redeployment production destination, and the production environment can be configured to be different than the test environment. Steps further can include redeploying the second selected web application to the redeployment production destination thereby to reduce redeployment time and control deployment to the production environment. Still further, steps can include determining whether the redeployment to the redeployment production destination was successful. When the redeployment to the redeployment production destination was successful, steps can include generating a notification to indicate that the second selected web application is in production by use of an electronic interface and sending an electronic message to the one of the plurality of users to indicate that the second selected web application is in production, for example.

In some circumstances, redeploying the first selected web application can include replacing a prior version of the first selected web application, and redeploying the second selected web application can include replacing a prior version of the second selected web application. Further, the method further can include archiving the prior version of the first selected web application when redeployment of the first selected web application was successful and archiving the prior version of the second selected web application when redeployment of the second selected web application was successful. In other circumstances, for example, redeploying the first selected web application can include deploying the first selected web application while continuing to operate a prior version of the first selected web application, and redeploying the second selected web application can include deploying the second selected web application while continuing to operate a prior version of the second selected web application.

Additionally, the test environment can include a functional testing environment and an operational testing environment. Further, the plurality of web applications can be related to one or more of the following: petroleum engineering and petroleum exploration. The plurality of web applications also can be one or more of the following: J2EE web applications and .NET web applications. In some instances, only a predetermined and limited number of web applications can be permitted to be redeployed to the production environment within a predetermined time period. For example, the predetermined and limited number of web applications can be two web applications, and the predetermined time period can be one week. Further, each of the first set of web applications can have been deployed previously in at least an initial deployment responsive to action associated with one or more administrator roles. Similarly, each of the second set of web applications can have been deployed previously in at least an initial deployment responsive to action associated with the one or more administrator roles. In addition, redeploying the first selected web application to the redeployment test destination can be independent of action associated with the one or more administrator roles, and redeploying the second selected web application to the redeployment production destination also can be independent of action associated with the one or more administrator roles.

In some circumstances, each of the first set of web applications can be configured to be displayed to only one user having a user identifier that includes an indicator that the associated user is one of the one or more developer users associated with the respective web application at a time. Further, a method further can include, when a redeployment was unsuccessful, generating a notification to indicate that redeployment failed by use of the electronic interface and sending an electronic message to the one of plurality of users to indicate that the redeployment failed.

Figure 8:
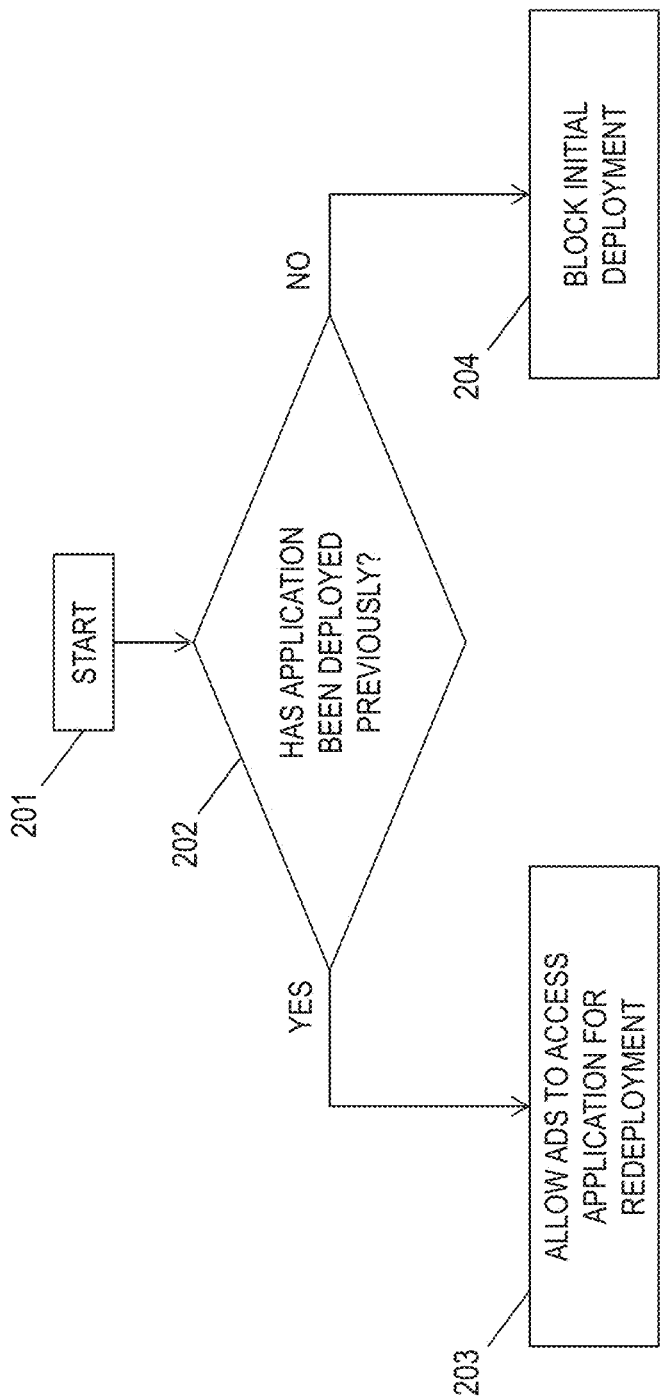
FIG. 8 is a schematic diagram of a method according to an embodiment of the invention.

For instance, a method according to an embodiment is depicted in FIG. 8. FIG. 8, for example, depicts an exemplary threshold determination to enable blocking access to initial deployment of web applications. For example, after starting 201, a method can include determining whether each of a plurality of web applications has been deployed previously 202. If the respective application has been deployed previously 202, a method can include allowing an embodiment, such as ADS, to access the application for redeployment 203. If the respective application has not been deployed previously 202, however, a method can include blocking initial deployment 204 of the application.

Figure 5:
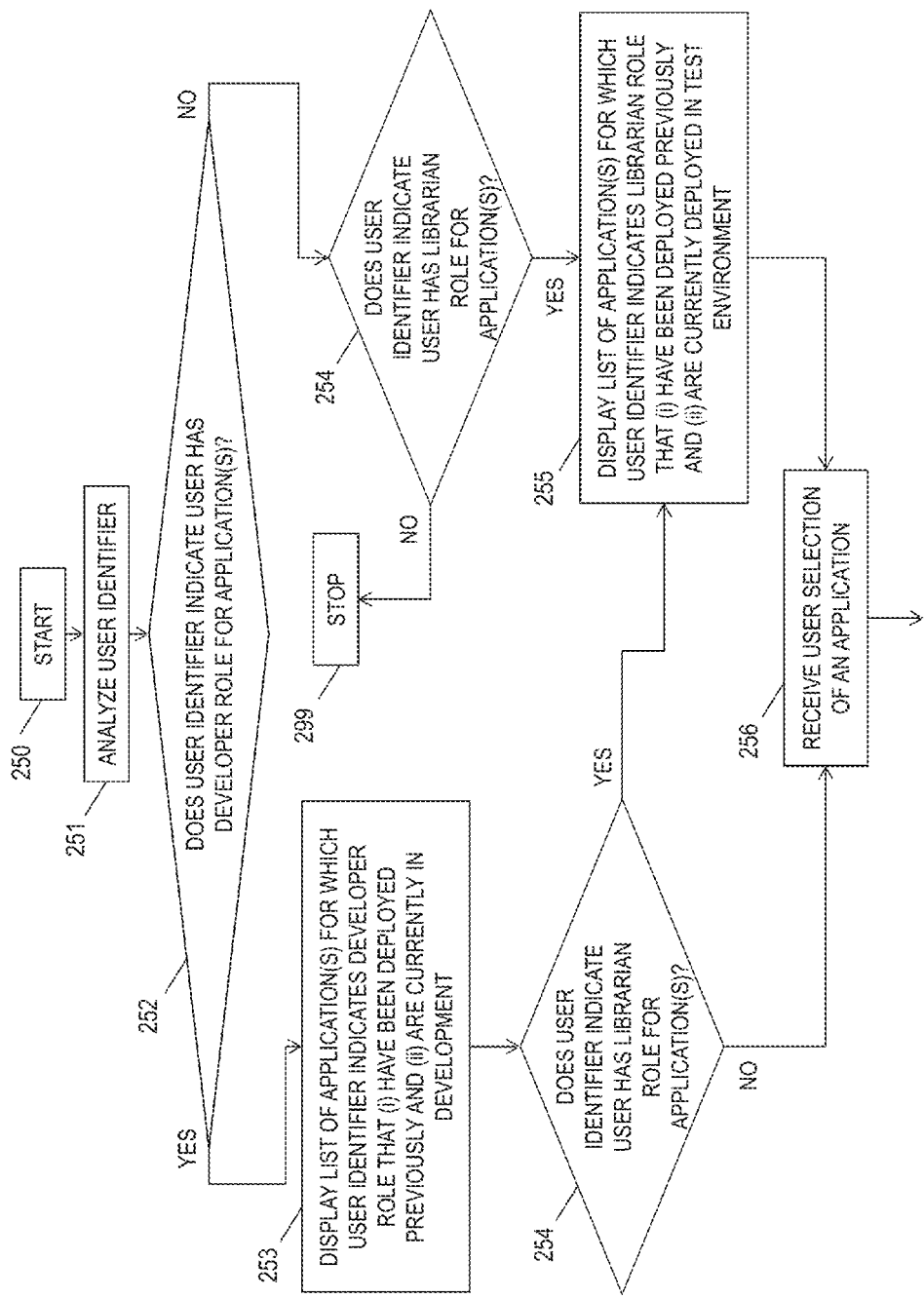
FIG. 5 is a schematic diagram of a method according to an embodiment of the invention.
Figure 6:
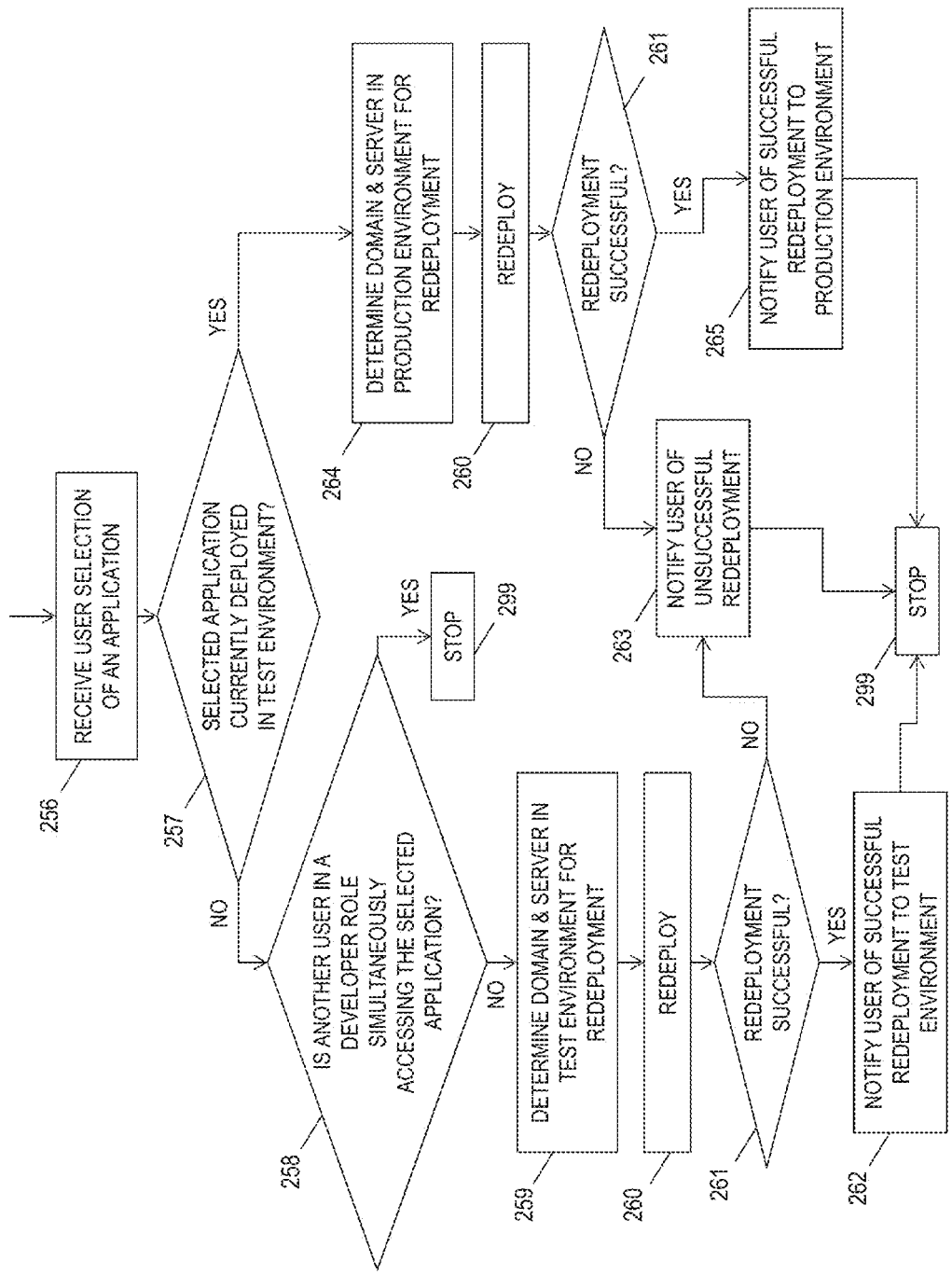
FIG. 6 is a schematic diagram of a method according to an embodiment of the invention.
Figure 7:
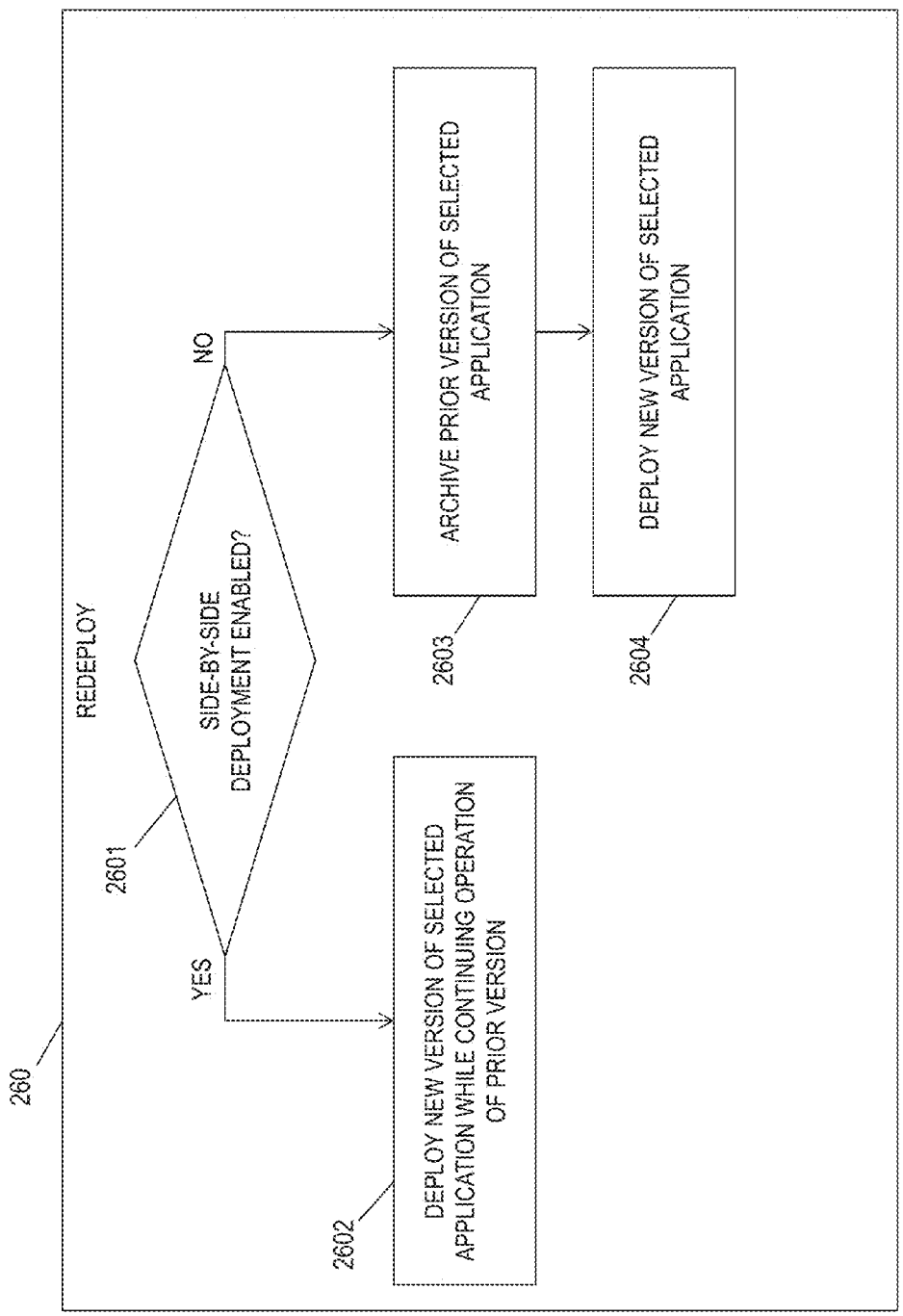
FIG. 7 is a schematic diagram of a method according to an embodiment of the invention.

A method according to an embodiment also can include, for example, the steps illustrated in FIGS. 5-7. For instance, after starting 250, a method can include analyzing a user's user identifier 251 to determine whether the user identifier indicates that the user has a developer role for one or more web applications 252, as illustrated in FIG. 5, for example. If the user identifier indicates that the user has a developer role for one or more web applications 252, a method then can include displaying a list of the web application or applications for which the user identifier indicates that the user has a developer role that (i) have been deployed previously and (ii) are currently in development 253 (i.e., have a current deployment status of in development). A method further can include determining whether the user identifier indicates that the user has a librarian role for one or more web applications 254, in addition to having a developer role for one or more web applications. If the user identifier indicates that the user does not have a librarian role for one or more web applications 254, a method can include receiving user selection of one of the listed web applications 256. If the user identifier indicates that the user also has a librarian role for one or more web applications 254, however, a method can include displaying a list of the web application or applications for which the user identifier indicates that the user has a librarian role that (i) have been deployed previously and (ii) are currently deployed in a test environment 255. If the user identifier indicates that the user does not have a developer role for one or more web applications 252, a method then can include determining whether the user identifier indicates that the user has a librarian role for one or more web applications 254. If the user identifier does not indicate that the user has a librarian role for one or more web applications 254—i.e., if the user identifier indicates neither a developer role nor a librarian role for any application—the process can stop 299. If the user identifier indicates that the user has a librarian role for one or more web applications 254, however, a method can include displaying a list of the web application or applications for which the user identifier indicates that the user has a librarian role that (i) have been deployed previously and (ii) are currently deployed in a test environment 255. Then, a method can include receiving user selection of one of the web applications from the displayed list or lists 256.

After receiving a user selection of a web application 256, as illustrated in FIG. 6, for example, a method can include determining whether the selected web application is currently deployed in a test environment 257. The preceding steps can ensure that any listed web application that is currently deployed in a test environment is an application that has been deployed previously and for which the user has a librarian role. Consequently, if the selected web application is currently deployed in a test environment 257, a method can include determining a domain and server in the production environment for redeployment of the selected web application 264 then redeploying 260 the selected web application. A method then can include determining whether the redeployment was successful 261. If redeployment of the selected web application to the production environment was successful 261, a method can include notifying the user of a successful redeployment to the production environment 265. If redeployment of the selected web application to the production environment was unsuccessful 261, however, a method can include notifying the user of a unsuccessful redeployment 263. After notifying the user of whether the redeployment was successful, the method can stop 299.

If the selected web application is not currently deployed in a test environment 257, a method can include determining whether another user in a developer role is simultaneously accessing the selected web application 258. If so, the method can stop 299. However, if there is not another user in a developer role simultaneously accessing the selected web application 258, a method can include determining a domain and server in the test environment for redeployment of the selected web application 259 then redeploying 260 the selected web application. A method can then include determining whether the redeployment to the test environment was successful 261. If redeployment was successful 261, a method can include notifying the user of a successful redeployment to the test environment 262 then stopping 299. But if redeployment was unsuccessful 261, a method can include notifying the user of an unsuccessful redeployment 263 then stopping 299.

Redeploying 260 a selected web application can include several steps related to a smart recovery feature, as illustrated, for example, in FIG. 7. For instance, redeploying 260 can include determining whether a side-by-side deployment feature is currently enabled 2601. If a side-by-side deployment feature is enabled 2601, a method can include deploying a new version of the selected web application while continuing operation of the prior version of the selected web application 2602. However, if a side-by-side deployment feature is not enabled 2601, a method can include archiving the prior version of the selected web application 2603 and deploying the new version of the selected web application 2604.

Embodiments additionally can include non-transitory computer-readable medium having one or more computer programs stored therein operable by one or more processors to enhance redeployment of web applications after initial deployment. For example, in non-transitory computer-readable medium according to an embodiment, the one or more computer programs can include a set of instructions that, when executed by the one or more processors, cause the one or more processors to perform a series of operations. Those operations can include, for example, blocking access to initial deployment of a plurality of web applications to a plurality of users. Each user can be configured to have a user identifier, and each of the plurality of web applications configured to be associated with a user identifier of one or more of the plurality of users in a web application developer role thereby to define one or more developer users. Additionally, each of the plurality of web applications further can be configured to be associated with a user identifier of a different one or more of the plurality of users in a web application librarian role thereby to define one or more librarian users. For example, a librarian role can be configured to indicate authorization to redeploy a web application to a production environment. Each of the plurality of web applications still further can be configured to have an associated current deployment status, and current deployment status including one or more of the following: in development and deployed in a test environment.

Operations also can include displaying a list of a first set of one or more web applications of the plurality of web applications to one of the plurality of users responsive to a determination that each of the first set of web applications has a current deployment status of in development and that the user identifier associated with the respective one of the plurality of users includes an indicator that the associated user is one of the one or more developer users associated with the respective web application. Operations further can include displaying a list of second set of another one or more web applications of the plurality of web applications to the one of the plurality of users responsive to a determination that each of the second set of web applications has a current deployment status of deployed in a test environment and that the user identifier associated with the respective one of the plurality of users includes an indicator of a librarian role associated with each of the second set of web applications.

In addition, some operations can be responsive to user selection of a web application from the list of the first set of web applications thereby to define a first selected web application. For example—responsive to user selection of a first selected web application—operations can include determining a domain and server in the test environment configured to host the first selected web application upon redeployment. The domain and server thereby can define a redeployment test destination, for example. Operations then can include redeploying the first selected web application to the redeployment test destination thereby to reduce redeployment time, as well as determining whether the redeployment to the redeployment test destination was successful. Still further, operations can include generating a notification to indicate that the first selected web application is in test by use of an electronic interface when the redeployment to the redeployment test destination was successful. Operations also can include sending an electronic message to the one of the plurality of users to indicate that the first selected web application is in test when the redeployment to the redeployment test destination was successful.

Likewise, some operations can be responsive to user selection of a web application from the list of the second set of web applications thereby to define a second selected web application. For instance, operations responsive to user selection of a second selected web application can include determining a domain and server in the production environment configured to host the second selected web application upon redeployment. The domain and server, for example, thereby can define a redeployment production destination. Further, the production environment can be configured to be different than the test environment. Operations then can include redeploying the second selected web application to the redeployment production destination thereby to reduce redeployment time and control deployment to the production environment. Operations also can include determining whether the redeployment to the redeployment production destination was successful. In addition, operations can include generating a notification to indicate that the second selected web application is in production by use of an electronic interface when the redeployment to the redeployment production destination was successful. When the redeployment to the redeployment production destination was successful, operations also can include sending an electronic message to the one of the plurality of users to indicate that the second selected web application is in production.

In some circumstances, redeploying the first selected web application can include replacing a prior version of the first selected web application, and redeploying the second selected web application can include replacing a prior version of the second selected web application. Additionally, the set of instructions, when executed by the one or more processors, further can cause the one or more processors to perform the operations of archiving the prior version of the first selected web application when redeployment of the first selected web application was successful and archiving the prior version of the second selected web application when redeployment of the second selected web application was successful.

In other circumstances, redeploying the first selected web application can include deploying the first selected web application while continuing to operate a prior version of the first selected web application. Similarly, redeploying the second selected web application can include deploying the second selected web application while continuing to operate a prior version of the second selected web application.

The test environment can include a functional testing environment and an operational testing environment, for example. Additionally, the plurality of web applications can be related to one or more of the following: petroleum engineering and petroleum exploration. Further, the plurality of web applications can be one or more of the following: J2EE web applications and .NET web applications. In some instances, only a predetermined and limited number of web applications can be permitted to be redeployed to the production environment within a predetermined time period. For example, the predetermined and limited number of web applications can be two web applications, and the predetermined time period can be one week. Further, each of the first set of web applications can have been deployed previously in at least an initial deployment responsive to action associated with one or more administrator roles. Likewise, each of the second set of web applications can have been deployed previously in at least an initial deployment responsive to action associated with the one or more administrator roles. Redeploying the first selected web application to the redeployment test destination, for example, can be independent of action associated with the one or more administrator roles. In addition, redeploying the second selected web application to the redeployment production destination can be independent of action associated with the one or more administrator roles.

In some instances, each of the first set of web applications can be configured to be displayed to only one user having a user identifier that includes an indicator that the associated user is one of the one or more developer users associated with the respective web application at a time. Further, the set of instructions, when executed by the one or more processors, further can cause the one or more processors to perform the operations of—when a redeployment was unsuccessful—generating a notification to indicate that redeployment failed by use of the electronic interface and sending an electronic message to the one of plurality of users to indicate that the redeployment failed.

Embodiments of the invention thus can include developments in software by computer programs, as will be understood by those skilled in the art. Further, web applications themselves can include developments in software by computer programs, as will be understood by those skilled in the art.

Figure 16:
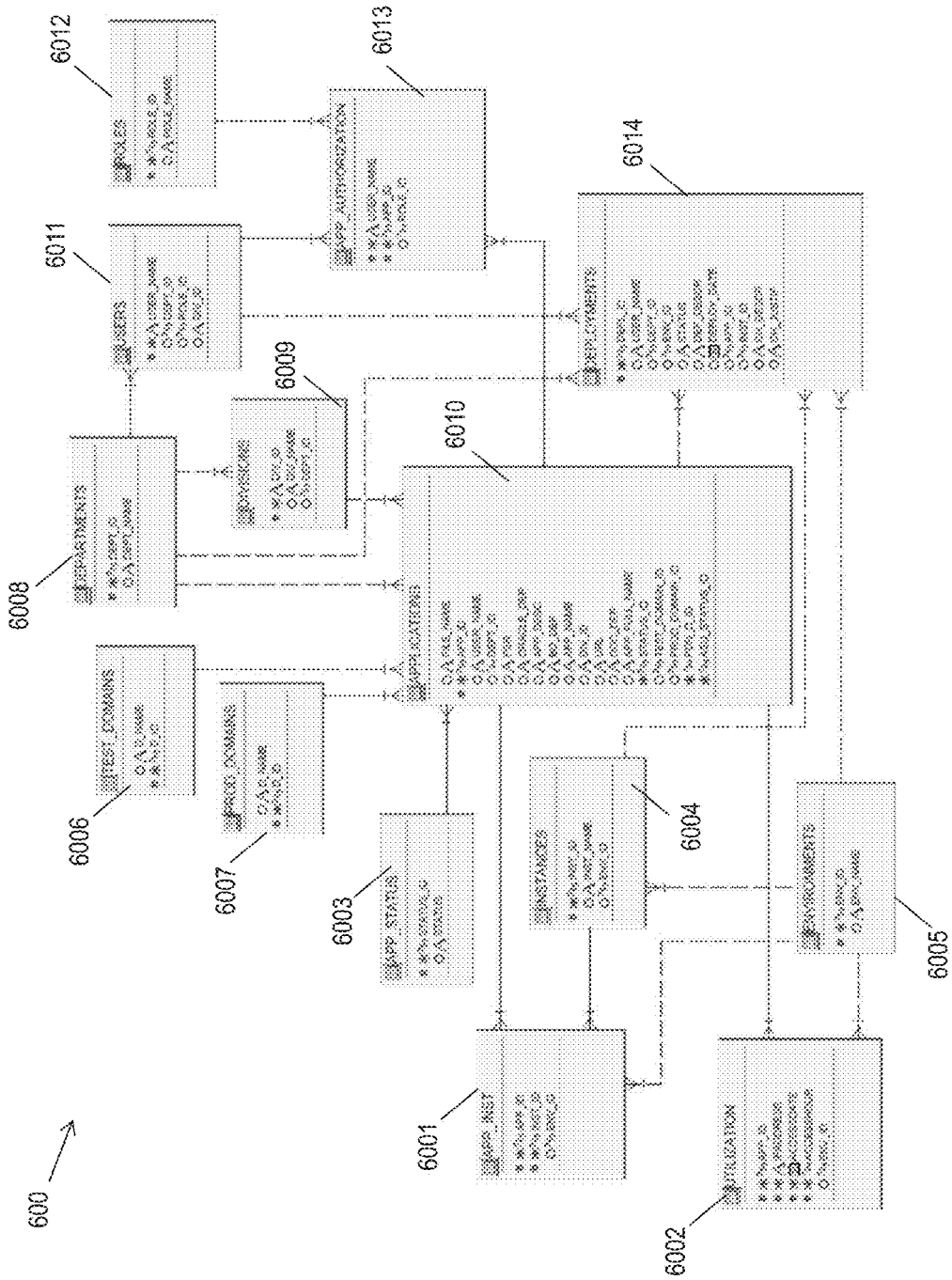
FIG. 16 is a schematic diagram of a data model according to an embodiment of the invention.

An exemplary data model 600 associated with an embodiment of the invention is illustrated in FIG. 16, for example. As depicted, the data model can include: application instance data 6001, utilization data 6002, application status data 6003, instances data 6004, environments data 6005, test domains data 6006, production domains data 6007, departments data 6008, divisions data 6009, applications data 6010, user data 6011, role data 6012, application authorization data 6013, and deployments data 6014. For instance, application instance data 6001 can associate an application with an instance and a deployment environment and can include, e.g., a department and division that developed the application. Application instance data 6001 also can include dependencies information regarding other platforms, e.g., Oracle, Documentum, and Business Objects. Further, utilization data 6002 can be used to check the utilization of the application by users to enable management decisions, e.g., the frequency with which an application is used within an organization. For example, utilization data 6002 can associate an application with IP addresses, a deployment environment, and access time data. In addition, application status data 6003 can associate a deployment status with an identifier of deployment status, e.g., test, active, service, decommissioned. Instances data 6004, for example, can associate an indicator of an instance with the instance's name and a deployment environment. Consequently, instances data 6004 can indicate where an application is deployed. Further, an instance can host many applications. Additionally, environments data 6005 can associate a deployment environment with an identifier of deployment environment, e.g., test, production, development in the future. Similarly, test domains data 6006 can associate a test domain with an identifier of test domain, and production domains data 6007 can associate a production domain with an identifier of production domain. A hosting environment can include, for example, four to five domains, and one domain can host many applications that belong to a division, for instance. Departments data 6008 also can associate a department with an identifier of department. Further, divisions data 6009 can associate a division with an identifier of division and with a department. Applications data 6010 can associate an application with, for example: file name, department, user name, application description, application name and full name, division, URL, document department, deployment status, test domain, and production domain. User data 6011 can associate a user with a department, role, and division, for example. Further, role data 6012 can associate a role with an identifier of role. Application authorization data 6013 can associate a user with an application and role, for example. In addition, deployments data 6014 can associate a deployment with a user, department, environment, deployment status, deployment description, deployment date, application, instance, change description, and change justification.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD−R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

The invention claimed is:

1. A system to enhance redeployment of web applications after initial deployment, the system comprising:
   one or more processors;
   one or more databases in communication with the one or more processors and having data associated with a plurality of web applications stored therein, each of the plurality of web applications configured to have an associated current deployment status, current deployment status including one or more of the following: in development and deployed in a test environment;
   one or more input and output units in communication with the one or more processors and positioned to receive input and output communication;
   one or more displays in communication with the one or more processors and configured to display an electronic user interface thereon; and non-transitory memory medium in communication with the one or more processors, the memory medium including:
  an access module including computer-readable instructions stored therein that when executed cause the one or more processors to perform the step of:
    blocking access to initial deployment of the plurality of web applications to a plurality of users, each user configured to have a user identifier, each of the plurality of web applications configured to be associated with a user identifier of one or more of the plurality of users in a web application developer role thereby to define one or more developer users, each of the plurality of web applications further configured to be associated with a user identifier of a different one or more of the plurality of users in a web application librarian role thereby to define one or more librarian users, a librarian role configured to indicate authorization to redeploy a web application to a production environment,
  a redeployment-eligible web applications module including computer-readable instructions stored therein that when executed cause the one or more processors to perform the steps of:
    displaying a list of a first set of one or more web applications of the plurality of web applications to one of the plurality of users responsive to a determination that each of the first set of web applications has a current deployment status of in development and that the user identifier associated with the respective one of the plurality of users includes an indicator that the associated user is one of the one or more developer users associated with the respective web application,
    displaying a list of second set of another one or more web applications of the plurality of web applications to the one of the plurality of users responsive to a determination that each of the second set of web applications has a current deployment status of deployed in a test environment and that the user identifier associated with the respective one of the plurality of users includes an indicator of a librarian role associated with each of the second set of web applications,
  a redeployment module including computer-readable instructions stored therein that when executed cause the one or more processors to perform the steps of:
    responsive to user selection of a web application from the list of the first set of web applications thereby to define a first selected web application:
      determining a domain and server in the test environment configured to host the first selected web application upon redeployment, the domain and server thereby to define a redeployment test destination,
      redeploying the first selected web application to the redeployment test destination thereby to reduce redeployment time,
      determining whether the redeployment to the redeployment test destination was successful,
      generating a notification to indicate that the first selected web application is in test by use of the electronic user interface when the redeployment to the redeployment test destination was successful, and
      sending an electronic message to the one of the plurality of users to indicate that the first selected web application is in test when the redeployment to the redeployment test destination was successful, and
    responsive to user selection of a web application from the list of the second set of web applications thereby to define a second selected web application:
      determining a domain and server in the production environment configured to host the second selected web application upon redeployment, the domain and server thereby to define a redeployment production destination, the production environment configured to be different than the test environment,
      redeploying the second selected web application to the redeployment production destination thereby to reduce redeployment time and control deployment to the production environment,
      determining whether the redeployment to the redeployment production destination was successful,
      generating a notification to indicate that the second selected web application is in production by use of the electronic user interface when the redeployment to the redeployment production destination was successful, and
      sending an electronic message to the one of the plurality of users to indicate that the second selected web application is in production when the redeployment to the redeployment production destination was successful.

2. A system as defined in claim 1, wherein redeploying the first selected web application includes replacing a prior version of the first selected web application, wherein redeploying the second selected web application includes replacing a prior version of the second selected web application, and wherein the redeployment module further includes computer-readable instructions stored therein that when executed cause the one or more processors to perform the steps of archiving the prior version of the first selected web application when redeployment of the first selected web application was successful and archiving the prior version of the second selected web application when redeployment of the second selected web application was successful.

3. A system as defined in claim 1, wherein redeploying the first selected web application includes deploying the first selected web application while continuing to operate a prior version of the first selected web application, and wherein redeploying the second selected web application includes deploying the second selected web application while continuing to operate a prior version of the second selected web application.

4. A system as defined in claim 1, wherein the test environment includes a functional testing environment and an operational testing environment, wherein the plurality of web applications are related to one or more of the following: petroleum engineering and petroleum exploration, and wherein the plurality of web applications are one or more of the following: J2EE web applications and .NET web applications.

5. A system as defined in claim 4, wherein only a predetermined and limited number of web applications are permitted to be redeployed to the production environment within a predetermined time period, wherein the predetermined and limited number of web applications is two web applications, and wherein the predetermined time period is one week.

6. A system as defined in claim 5, wherein each of the first set of web applications has been deployed previously in at least an initial deployment responsive to action associated with one or more administrator roles, wherein each of the second set of web applications has been deployed previously in at least an initial deployment responsive to action associated with the one or more administrator roles, wherein redeploying the first selected web application to the redeployment test destination is independent of action associated with the one or more administrator roles, and wherein redeploying the second selected web application to the redeployment production destination is independent of action associated with the one or more administrator roles.

7. A system as defined in claim 1, wherein each of the first set of web applications is configured to be displayed to only one user having a user identifier that includes an indicator that the associated user is one of the one or more developer users associated with the respective web application at a time, and wherein the redeployment module further includes computer-readable instructions stored therein that when executed cause the one or more processors to perform the steps of, when a redeployment was unsuccessful:
  generating a notification to indicate that redeployment failed by use of the electronic user interface; and
  sending an electronic message to the one of plurality of users to indicate that the redeployment failed.

8. A computer-implemented method to enhance redeployment of web applications after initial deployment, the method comprising:
  blocking access to initial deployment of a plurality of web applications to a plurality of users, each user configured to have a user identifier, each of the plurality of web applications configured to be associated with a user identifier of one or more of the plurality of users in a web application developer role thereby to define one or more developer users, each of the plurality of web applications further configured to be associated with a user identifier of a different one or more of the plurality of users in a web application librarian role thereby to define one or more librarian users, a librarian role configured to indicate authorization to redeploy a web application to a production environment, each of the plurality of web applications still further configured to have an associated current deployment status, current deployment status including one or more of the following: in development and deployed in a test environment;
  displaying a list of a first set of one or more web applications of the plurality of web applications to one of the plurality of users responsive to a determination that each of the first set of web applications has a current deployment status of in development and that the user identifier associated with the respective one of the plurality of users includes an indicator that the associated user is one of the one or more developer users associated with the respective web application;
  displaying a list of second set of another one or more web applications of the plurality of web applications to the one of the plurality of users responsive to a determination that each of the second set of web applications has a current deployment status of deployed in a test environment and that the user identifier associated with the respective one of the plurality of users includes an indicator of a librarian role associated with each of the second set of web applications;
  responsive to user selection of a web application from the list of the first set of web applications thereby to define a first selected web application:
    determining a domain and server in the test environment configured to host the first selected web application upon redeployment, the domain and server thereby to define a redeployment test destination,
    redeploying the first selected web application to the redeployment test destination thereby to reduce redeployment time,
    determining whether the redeployment to the redeployment test destination was successful,
    generating a notification to indicate that the first selected web application is in test by use of an electronic interface when the redeployment to the redeployment test destination was successful, and
    sending an electronic message to the one of the plurality of users to indicate that the first selected web application is in test when the redeployment to the redeployment test destination was successful; and
  responsive to user selection of a web application from the list of the second set of web applications thereby to define a second selected web application:
    determining a domain and server in the production environment configured to host the second selected web application upon redeployment, the domain and server thereby to define a redeployment production destination, the production environment configured to be different than the test environment,
    redeploying the second selected web application to the redeployment production destination thereby to reduce redeployment time and control deployment to the production environment,
    determining whether the redeployment to the redeployment production destination was successful,
    generating a notification to indicate that the second selected web application is in production by use of an electronic interface when the redeployment to the redeployment production destination was successful, and
    sending an electronic message to the one of the plurality of users to indicate that the second selected web application is in production when the redeployment to the redeployment production destination was successful.

9. A computer-implemented method as defined in claim 8, wherein redeploying the first selected web application includes replacing a prior version of the first selected web application, wherein redeploying the second selected web application includes replacing a prior version of the second selected web application, and wherein the method further comprises archiving the prior version of the first selected web application when redeployment of the first selected web application was successful and archiving the prior version of the second selected web application when redeployment of the second selected web application was successful.

10. A computer-implemented method as defined in claim 8, wherein redeploying the first selected web application includes deploying the first selected web application while continuing to operate a prior version of the first selected web application, and wherein redeploying the second selected web application includes deploying the second selected web application while continuing to operate a prior version of the second selected web application.

11. A computer-implemented method as defined in claim 8, wherein the test environment includes a functional testing environment and an operational testing environment, wherein the plurality of web applications are related to one or more of the following: petroleum engineering and petroleum exploration, and wherein the plurality of web applications are one or more of the following: J2EE web applications and .NET web applications.

12. A computer-implemented method as defined in claim 11, wherein only a predetermined and limited number of web applications are permitted to be redeployed to the production environment within a predetermined time period, wherein the predetermined and limited number of web applications is two web applications, and wherein the predetermined time period is one week.

13. A computer-implemented method as defined in claim 12, wherein each of the first set of web applications has been deployed previously in at least an initial deployment responsive to action associated with one or more administrator roles, wherein each of the second set of web applications has been deployed previously in at least an initial deployment responsive to action associated with the one or more administrator roles, wherein redeploying the first selected web application to the redeployment test destination is independent of action associated with the one or more administrator roles, and wherein redeploying the second selected web application to the redeployment production destination is independent of action associated with the one or more administrator roles.

14. A computer-implemented method as defined in claim 8, wherein each of the first set of web applications is configured to be displayed to only one user having a user identifier that includes an indicator that the associated user is one of the one or more developer users associated with the respective web application at a time, and wherein the method further comprises, when a redeployment was unsuccessful:
  generating a notification to indicate that redeployment failed by use of the electronic interface; and
  sending an electronic message to the one of plurality of users to indicate that the redeployment failed.

15. Non-transitory computer-readable medium having one or more computer programs stored therein operable by one or more processors to enhance redeployment of web applications after initial deployment, the one or more computer programs comprising a set of instructions that, when executed by the one or more processors, cause the one or more processors to perform the operations of:
  blocking access to initial deployment of a plurality of web applications to a plurality of users, each user configured to have a user identifier, each of the plurality of web applications configured to be associated with a user identifier of one or more of the plurality of users in a web application developer role thereby to define one or more developer users, each of the plurality of web applications further configured to be associated with a user identifier of a different one or more of the plurality of users in a web application librarian role thereby to define one or more librarian users, a librarian role configured to indicate authorization to redeploy a web application to a production environment, each of the plurality of web applications still further configured to have an associated current deployment status, current deployment status including one or more of the following: in development and deployed in a test environment;
  displaying a list of a first set of one or more web applications of the plurality of web applications to one of the plurality of users responsive to a determination that each of the first set of web applications has a current deployment status of in development and that the user identifier associated with the respective one of the plurality of users includes an indicator that the associated user is one of the one or more developer users associated with the respective web application;
  displaying a list of second set of another one or more web applications of the plurality of web applications to the one of the plurality of users responsive to a determination that each of the second set of web applications has a current deployment status of deployed in a test environment and that the user identifier associated with the respective one of the plurality of users includes an indicator of a librarian role associated with each of the second set of web applications;
  responsive to user selection of a web application from the list of the first set of web applications thereby to define a first selected web application:
    determining a domain and server in the test environment configured to host the first selected web application upon redeployment, the domain and server thereby to define a redeployment test destination,
    redeploying the first selected web application to the redeployment test destination thereby to reduce redeployment time,
    determining whether the redeployment to the redeployment test destination was successful,
    generating a notification to indicate that the first selected web application is in test by use of an electronic interface when the redeployment to the redeployment test destination was successful, and
    sending an electronic message to the one of the plurality of users to indicate that the first selected web application is in test when the redeployment to the redeployment test destination was successful; and
  responsive to user selection of a web application from the list of the second set of web applications thereby to define a second selected web application:
    determining a domain and server in the production environment configured to host the second selected web application upon redeployment, the domain and server thereby to define a redeployment production destination, the production environment configured to be different than the test environment,
    redeploying the second selected web application to the redeployment production destination thereby to reduce redeployment time and control deployment to the production environment,
    determining whether the redeployment to the redeployment production destination was successful,
    generating a notification to indicate that the second selected web application is in production by use of an electronic interface when the redeployment to the redeployment production destination was successful, and
    sending an electronic message to the one of the plurality of users to indicate that the second selected web application is in production when the redeployment to the redeployment production destination was successful.

16. Non-transitory computer-readable medium having one or more computer programs stored therein of claim 15, wherein redeploying the first selected web application includes replacing a prior version of the first selected web application, wherein redeploying the second selected web application includes replacing a prior version of the second selected web application, and wherein the set of instructions, when executed by the one or more processors, further cause the one or more processors to perform the operations of archiving the prior version of the first selected web application when redeployment of the first selected web application was successful and archiving the prior version of the second selected web application when redeployment of the second selected web application was successful.

17. Non-transitory computer-readable medium having one or more computer programs stored therein of claim 15, wherein redeploying the first selected web application includes deploying the first selected web application while continuing to operate a prior version of the first selected web application, and wherein redeploying the second selected web application includes deploying the second selected web application while continuing to operate a prior version of the second selected web application.

18. Non-transitory computer-readable medium having one or more computer programs stored therein of claim 15, wherein the test environment includes a functional testing environment and an operational testing environment, wherein the plurality of web applications are related to one or more of the following: petroleum engineering and petroleum exploration, and wherein the plurality of web applications are one or more of the following: J2EE web applications and .NET web applications.

19. Non-transitory computer-readable medium having one or more computer programs stored therein of claim 18, wherein only a predetermined and limited number of web applications are permitted to be redeployed to the production environment within a predetermined time period, wherein the predetermined and limited number of web applications is two web applications, and wherein the predetermined time period is one week.

20. Non-transitory computer-readable medium having one or more computer programs stored therein of claim 19, wherein each of the first set of web applications has been deployed previously in at least an initial deployment responsive to action associated with one or more administrator roles, wherein each of the second set of web applications has been deployed previously in at least an initial deployment responsive to action associated with the one or more administrator roles, wherein redeploying the first selected web application to the redeployment test destination is independent of action associated with the one or more administrator roles, and wherein redeploying the second selected web application to the redeployment production destination is independent of action associated with the one or more administrator roles.

21. Non-transitory computer-readable medium having one or more computer programs stored therein of claim 15, wherein each of the first set of web applications is configured to be displayed to only one user having a user identifier that includes an indicator that the associated user is one of the one or more developer users associated with the respective web application at a time, and wherein the set of instructions, when executed by the one or more processors, further cause the one or more processors to perform the operations of, when a redeployment was unsuccessful:

generating a notification to indicate that redeployment failed by use of the electronic interface; and sending an electronic message to the one of plurality of users to indicate that the redeployment failed.

* * * * *